(12) United States Patent
Inoue et al.

(10) Patent No.: US 9,171,016 B2
(45) Date of Patent: Oct. 27, 2015

(54) CONTENT SELECTION APPARATUS AND CONTENT SELECTION METHOD

(71) Applicant: Panasonic Intellectual Property Corporation of America, Torrance, CA (US)

(72) Inventors: Ryuji Inoue, Osaka (JP); Minehisa Nagata, Osaka (JP)

(73) Assignee: PANASONIC INTELLECTUAL PROPERTY CORPORATION OF AMERICA, Torrence, CA (US)

( * ) Notice: Subject to any disclaimer, the term of this patent is extended or adjusted under 35 U.S.C. 154(b) by 26 days.

(21) Appl. No.: 14/003,001

(22) PCT Filed: Dec. 11, 2012

(86) PCT No.: PCT/JP2012/007888
§ 371 (c)(1),
(2) Date: Sep. 4, 2013

(87) PCT Pub. No.: WO2013/088696
PCT Pub. Date: Jun. 20, 2013

(65) Prior Publication Data
US 2014/0056541 A1    Feb. 27, 2014

(30) Foreign Application Priority Data
Dec. 13, 2011  (JP) .................. 2011-271902

(51) Int. Cl.
| | | |
|---|---|---|
| G06F 17/30 | (2006.01) |
| H04N 21/458 | (2011.01) |
| H04N 21/432 | (2011.01) |
| H04N 21/442 | (2011.01) |
| H04N 21/81 | (2011.01) |

(52) U.S. Cl.
CPC ...... *G06F 17/30265* (2013.01); *H04N 21/4325* (2013.01); *H04N 21/44222* (2013.01); *H04N 21/458* (2013.01); *H04N 21/8153* (2013.01)

(58) Field of Classification Search
None
See application file for complete search history.

(56) References Cited

U.S. PATENT DOCUMENTS

| | | | |
|---|---|---|---|
| 7,477,805 B2 | 1/2009 | Ohtsuka et al. | |
| 7,840,586 B2 * | 11/2010 | Hakala et al. | ................ 707/765 |

(Continued)

FOREIGN PATENT DOCUMENTS

| | | |
|---|---|---|
| JP | 2006-054736 | 2/2006 |
| JP | 2006-079461 | 3/2006 |

(Continued)

OTHER PUBLICATIONS

International Search Report issued Mar. 19, 2013 in International (PCT) Application No. PCT/JP2012/007888.

*Primary Examiner* — Nirav G Patel
*Assistant Examiner* — Ian Lemieux
(74) *Attorney, Agent, or Firm* — Wenderoth, Lind & Ponack, L.L.P.

(57) ABSTRACT

A content selection apparatus selects a target content item which is a content item to be presented to a user, from a plurality of content items. The plurality of content items are sorted into a plurality of management units according to a creation date and time of each content item. The content selection apparatus includes a selection unit that selects a predetermined number of management units in ascending order of the number of sorted content items, and selects a content item that belongs to the selected management units as the target content item.

17 Claims, 25 Drawing Sheets

(56) References Cited

U.S. PATENT DOCUMENTS

| | | | |
|---|---|---|---|
| 8,457,407 B2 | 6/2013 | Wada | |
| 2005/0246374 A1* | 11/2005 | Blinn et al. | 707/104.1 |
| 2006/0056737 A1 | 3/2006 | Ohtsuka et al. | |
| 2008/0069540 A1* | 3/2008 | Takagi et al. | 386/117 |
| 2009/0089711 A1* | 4/2009 | Dunton et al. | 715/838 |
| 2010/0058236 A1* | 3/2010 | Inoue et al. | 715/810 |
| 2010/0142833 A1* | 6/2010 | Ishizawa | 382/224 |
| 2010/0149399 A1* | 6/2010 | Mukai et al. | 348/333.02 |
| 2011/0110592 A1 | 5/2011 | Wada | |
| 2014/0304019 A1* | 10/2014 | Scott | 705/7.15 |

FOREIGN PATENT DOCUMENTS

| | | |
|---|---|---|
| JP | 2006-279764 | 10/2006 |
| JP | 2009-289203 | 12/2009 |
| JP | 2010-021691 | 1/2010 |
| JP | 2010-074861 | 4/2010 |
| JP | 2010-109634 | 5/2010 |
| JP | 2010-141412 | 6/2010 |
| JP | 2011-103588 | 5/2011 |

\* cited by examiner

FIG. 3

| Folder ID | Folder name | Number of content items | Earliest capture date and time | Latest capture date and time |
|---|---|---|---|---|
| FLD00001 | Folder 1 | 3 | 2011.9.25 | 2011.9.25 |
| FLD00002 | Folder 2 | 4 | 2011.10.1 | 2011.10.1 |
| FLD00003 | Folder 3 | 50 | 2011.10.8 | 2011.10.10 |
| FLD00004 | Folder 4 | 1 | 2011.10.12 | 2011.10.12 |
| FLD00005 | Folder 5 | 2 | 2011.10.15 | 2011.10.15 |
| FLD00006 | Folder 6 | 1 | 2011.10.16 | 2011.10.16 |
| FLD00007 | Folder 7 | 8 | 2011.10.22 | 2011.10.22 |
| FLD00008 | Folder 8 | 30 | 2011.10.23 | 2011.10.23 |
| FLD00009 | Folder 9 | 1 | 2011.10.25 | 2011.10.25 |
| FLD00010 | Folder 10 | 2 | 2011.11.10 | 2011.11.10 |
| FLD00011 | Folder 11 | 3 | 2011.11.11 | 2011.11.11 |
| FLD00012 | Folder 12 | 5 | 2011.11.12 | 2011.11.12 |

FIG. 7

| Content ID 701 | Filename 702 | Folder ID 301 | Capture date and time 703 | Object ID 704 | Object area 705 | Object feature value 706 |
|---|---|---|---|---|---|---|
| CNT00001 | pic00001.jpg | FLD00001 | 2011.9.25 14:24:15 | OBJ00001 | (1350, 800, 1200, 1200) | (21, 252, ...) |
| CNT00002 | pic00002.jpg | FLD00001 | 2011.9.25 14:25:30 | | | |
| CNT00003 | pic00003.jpg | FLD00001 | 2011.9.25 14:34:02 | OBJ00002 | (1000, 700, 500, 500) | (124, 56, ...) |
| | | | | OBJ00003 | (2400, 700, 500, 500) | (84, 125, ...) |
| CNT00004 | pic00004.jpg | FLD00002 | 2011.10.1 11:03:50 | OBJ00004 | (2000, 600, 1200, 1200) | (88, 120, ...) |
| CNT00005 | pic00005.jpg | FLD00002 | 2011.10.1 11:04:24 | | | |
| CNT00006 | pic00006.jpg | FLD00002 | 2011.10.1 11:04:31 | | | |
| CNT00007 | pic00007.jpg | FLD00002 | 2011.10.1 11:06:04 | OBJ00005 | (2000, 600, 1200, 1200) | (92, 156, ...) |
| ... | ... | ... | ... | | | |

FIG. 10

| Cluster ID 1001 | Object ID 704 | Number of objects in cluster 1002 | Importance level 1003 |
|---|---|---|---|
| CLS0001 | OBJ00001, OBJ00003, ... | 92 | 1 |
| CLS0002 | OBJ00002 | 1 | 5 |
| CLS0003 | OBJ00004 | 1 | 5 |
| CLS0004 | OBJ00005 | 1 | 5 |
| CLS0005 | OBJ00011, OBJ00014, ... | 52 | 2 |
| CLS0006 | OBJ00018, OBJ00019 | 2 | 4 |
| CLS0007 | OBJ00029 | 1 | 5 |
| CLS0008 | OBJ00027, OBJ00031, ... | 8 | 3 |

FIG. 14

| Content ID | Filename | Folder ID | Capture date and time | Object ID | | | Elevation angle |
|---|---|---|---|---|---|---|---|
| CNT00001 | pic00001jpg | FLD00001 | 2011.9.25 14:24:15 | OBJ00001 | | | 0° |
| CNT00002 | pic00002jpg | FLD00001 | 2011.9.25 14:25:30 | | | | 1° |
| CNT00003 | pic00003jpg | FLD00001 | 2011.9.25 14:34:02 | OBJ00002 OBJ00003 | | | -4° |
| CNT00004 | pic00004jpg | FLD00002 | 2011.10.1 11:03:50 | OBJ00004 | | | 3° |
| CNT00005 | pic00005jpg | FLD00002 | 2011.10.1 11:04:24 | | | | 1° |
| CNT00006 | pic00006jpg | FLD00002 | 2011.10.1 11:04:31 | | | | 0° |
| CNT00007 | pic00007jpg | FLD00002 | 2011.10.1 11:06:04 | OBJ00005 | | | 5° |
| ... | ... | ... | ... | | | | ... |
| CNT00058 | pic00058jpg | FLD00004 | 2011.10.14 | | | | |
| CNT00059 | pic00059jpg | FLD00005 | 2011.10.15 | OBJ00046 | | | 55° |
| CNT00060 | pic00060jpg | FLD00005 | 2011.10.15 | | | | |
| CNT00061 | pic00061jpg | FLD00006 | 2011.10.16 | OBJ00047 | | | -60° |
| ... | ... | ... | ... | | | | ... |

| Content ID |
|---|
| CNT00101 |
| CNT00103 |
| CNT00105 |
| CNT00106 |
| CNT00107 |

FIG. 19

| Content ID | Filename | Folder ID | Capture date and time | Text information ID | Text information area | Text recognition result |
|---|---|---|---|---|---|---|
| CNT00101 | pic00101.jpg | FLD00021 | 2011.9.25 9:05:20 | CHR00031 | (2200, 600, 460, 1200) | Sports day |
| CNT00102 | pic00102.jpg | FLD00021 | 2011.9.25 9:05:35 | | | |
| CNT00103 | pic00103.jpg | FLD00022 | 2011.10.8 10:20:02 | CHR00032 | (2200, 800, 1800, 800) | Osaka |
| CNT00104 | pic00104.jpg | FLD00022 | 2011.10.8 10:31:50 | | | |
| CNT00105 | pic00105.jpg | FLD00022 | 2011.10.8 10:42:23 | CHR00033 | (1100, 770, 2000, 700) | Shin-Osaka |
| CNT00106 | pic00106.jpg | FLD00022 | 2011.10.8 11:01:31 | CHR00034 | (600, 600, 1200, 600) | Kyoto |
| CNT00107 | pic00107.jpg | FLD00022 | 2011.10.8 11:40:04 | CHR00035 | (1000, 600, 1800, 600) | Nagoya |

| 2401 Creation timing | 2402 Content selection range | 2403 Content selection method | 2404 Selection key |
|---|---|---|---|
| Immediately after reception of creation rule or upon first creation allowance | Most recent two months | Content item including object feature value whose distance from object feature value indicated by selection key is less than or equal to N | (124, 67, ...) |

FIG. 25

| Execution flag /2501 | Registration date and time /2502 | Creation timing /2401 | Content selection range /2402 | Content selection method /2403 | Selection key /2404 |
|---|---|---|---|---|---|
| Unexecuted | 2011.10.5 02:01:31 | After reception of creation rule or upon first creation allowance | Most recent two months | Content item including object feature value whose distance from object feature value indicated by selection key is less than or equal to N | (124, 67, ...) |
| Executed | 2011.9.22 02:02:21 | After reception of creation rule or upon first creation allowance | Date one year ago from creation date and 15 days before and after date, 31 days in total | Content item including character string indicated by selection key as text information | "Sports day" |

CONTENT SELECTION APPARATUS AND CONTENT SELECTION METHOD

BACKGROUND OF INVENTION

1. Technical Field

The present invention relates to a content selection apparatus and a content selection method for selecting a content item to be presented to a user from content items such as still images and moving images.

2. Background Art

The widespread use of a digital imaging device such as a digital camera and a camera phone and the increase in capacity of a recording medium installed in or connected to such an imaging device have provided greater opportunities for a user to create content items (photographs or movies (video)). Moreover, the significant increase in storage capacity of a content management apparatus (such as a personal computer and a hard disk recorder) for storing and managing created content items enables large amounts of content items to be stored in the content management apparatus.

Meanwhile, the user does not have many occasions to look back the content items stored in the content management apparatus. Many content items stored in the content management apparatus have been either viewed by the user only once or left without ever being viewed by the user.

In most cases, content items such as photographs or movies show objects which the user intends to record. In the case where an object different from that intended by the user is shown in a content item, however, the user may enjoy an element of chance and surprise upon looking back such a content item. Besides, when content items captured in different situations are collected and presented to the user, the user may enjoy finding out some commonality between the content items.

A content item that not only has few opportunities of being looked back but delivers unexpected value (fun, interest) to the user as the user can enjoy an element of chance and surprise from the content item is referred to as "dead storage content item" in this description.

If the user is aware of an element of chance and surprise brought by such a content item, the user looks back the content item not only once but in various ways. This reduces the number of dead storage content items. If the user is unaware of an element of chance and surprise brought by the content item, however, the user merely views the content item only once or leaves the content item in the content management apparatus without ever looking back. This increases the number of dead storage content items.

In view of this, for instance, a technique whereby a content item which the user has not viewed for a while is automatically extracted and displayed based on a user operation is disclosed (for example, see Patent Literature (PTL) 1).

CITATION LIST

Patent Literature

[PTL 1]
Japanese Unexamined Patent Application Publication No. 2010-74861

SUMMARY OF INVENTION

As described above, there is a problem to reduce deal storage content items stored in the content management apparatus and present a content item from which the user can enjoy an element of chance and surprise.

The present invention solves the problem stated above, and has an object of providing a content selection apparatus capable of more appropriately selecting a content item in order to present a content item with a great element of chance and surprise to a user.

A content selection apparatus according to an aspect of the present invention is a content selection apparatus that selects a content item from a plurality of content items, the content selection apparatus including: an obtainment unit that obtains the plurality of content items; and a selection unit that selects a target content item from the plurality of content items, the target content item being a content item to be presented to a user, wherein each of the plurality of content items is sorted into one of a plurality of management units that corresponds to a creation date of the content item, and the selection unit selects a predetermined number of management units in ascending order of the number of sorted content items, and selects a content item that belongs to the selected management units as the target content item.

These general and specific aspects may be implemented using a system, a method, an integrated circuit, a computer program, or a computer-readable recording medium such as a CD-ROM, or any combination of systems, methods, integrated circuits, computer programs, and recording media.

According to the present invention, it is possible to more appropriately select a content item in order to present a content item with a great element of chance and surprise to a user.

BRIEF DESCRIPTION OF DRAWINGS

FIG. 3 is a diagram showing an example of a data structure of a folder metadata file according to Embodiment 1.

FIG. 7 is a diagram showing an example of a structure and details of a content metadata file according to Embodiment 2.

FIG. 10 is a diagram showing an example of a structure and details of cluster information.

FIG. 14 is a diagram showing an example of a structure and details of a content metadata file according to Embodiment 3.

FIG. 18 is a diagram showing an example of a structure and details of text information detection content information.

FIG. 19 is a diagram showing an example of a structure and details of a content metadata file according to Embodiment 4.

FIG. 24 is a diagram showing an example of a structure and details of a creation rule.

FIG. 25 is a diagram showing an example of a structure and details of creation rule information.

DETAILED DESCRIPTION OF INVENTION

Figure 1:
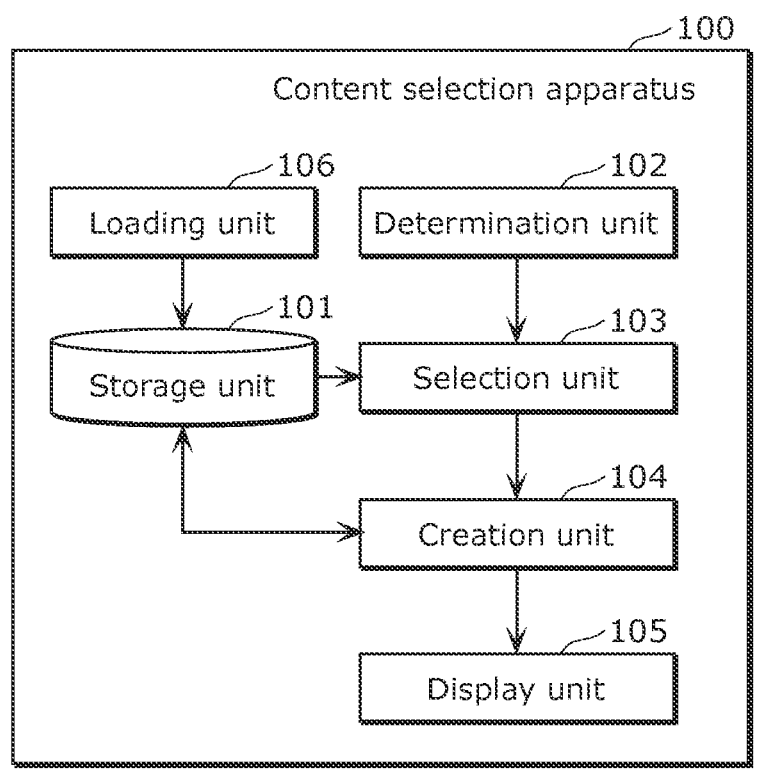
FIG. 1 is a block diagram showing a functional structure of a content selection apparatus according to Embodiment 1.

[Underlying Knowledge Forming Basis of the Present Invention]

As mentioned earlier, PTL 1 discloses a technique whereby an image which the user has not viewed for a while is automatically extracted and displayed based on a user operation.

In the technique described in PTL 1, a user operation is converted to a count value, and a content item is presented to the user according to the converted count value. In detail, a content item with a smaller count value, i.e. a content item determined to have not been viewed by the user for a while, is automatically extracted and displayed.

However, a content item with a smaller count value is a content item for which few user operations have been performed because it is not of particular interest to the user. Such a content item is not necessarily a content item with a great element of chance and surprise that delivers unexpected value to the user.

Therefore, merely presenting a content item selected based on a count value loosely to the user has little effect in reducing dead storage content items.

In view of this, a content selection apparatus according to an aspect of the present invention is a content selection apparatus that selects a content item from a plurality of content items, the content selection apparatus including: an obtainment unit that obtains the plurality of content items; and a selection unit that selects a target content item from the plurality of content items, the target content item being a content item to be presented to a user, wherein each of the plurality of content items is sorted into one of a plurality of management units that corresponds to a creation date of the content item, and the selection unit selects a predetermined number of management units in ascending order of the number of sorted content items, and selects a content item that belongs to the selected management units as the target content item.

With this structure, a "content item capturing daily life", which the user tends not to look back often, is selected as the target content item. A work content item created using such content items can thus be presented to the user.

For example, the selection unit may select a predetermined number of target content items.

With this structure, an appropriate number of content items can be selected to create a work content item.

For example, the content selection apparatus may further include a selection mode switching unit that switches a selection mode which is a selection method for the target content item by the selection unit, wherein the selection unit selects the predetermined number of management units in ascending order of the number of sorted content items and selects the content item that belongs to the selected management units as the target content item, in the case where the selection mode switching unit switches the selection mode to a first selection mode.

For example, the selection unit may select a predetermined number of management units in descending order of the number of sorted content items and select a content item that belongs to the selected management units as the target content item, in the case where the selection mode switching unit switches the selection mode to a second selection mode different from the first selection mode.

Through this content selection, in the case where many content items belong to a management unit (e.g. a folder) for content management, a work content item that enables the content items included in the management unit to be looked back in a digest form can be created and presented to the user.

For example, the selection unit may, in the case where a selection date is at least a predetermined number of days after a beginning day of a month to which the selection date belongs, select the target content item from the plurality of content items created in a month that immediately precedes the month to which the selection date belongs, the selection date being a date on which the content selection apparatus selects the target content item.

For example, the content selection apparatus may further include: a feature value extraction unit that, for each of the plurality of content items, detects an object included in the content item and extracts a feature value of the detected object; and an importance level calculation unit that classifies a plurality of objects detected by the feature value extraction unit into groups of objects similar to each other based on feature values, determines an importance level for each group of objects based on a predetermined condition, and assigns the importance level to the objects, wherein the selection unit selects, as the target content item, a content item that includes an object whose importance level is less than or equal to a predetermined value from among the plurality of content items, in the case where the selection mode switching unit switches the selection mode to a third selection mode different from the first selection mode.

With this structure, a content item that offers the user an element of surprise, such as "I never thought I'd find him here", "Who is this person pictured large?", "Funny this pattern looks like a human face", or "Why is this in the picture?", is selected as the target content item. A work content item created using such content items can thus be presented to the user.

For example, the content selection apparatus may further include a feature value extraction unit that, for each of the plurality of content items, detects whether or not a predetermined object is included in the content item, wherein each of the plurality of content items includes information indicating an elevation angle when capturing the content item, and the selection unit selects, as the target content item, a content item that includes the predetermined object and whose elevation angle is within a predetermined range from among the plurality of content items, in the case where the selection mode switching unit switches the selection mode to a fourth selection mode different from the first selection mode.

With this structure, a content item that offers the user an element of surprise, such as "I never thought I'd find a human face here", is selected as the target content item. A work content item created using such content items can thus be presented to the user.

For example, each of the plurality of content items may include information indicating an elevation angle when capturing the content item, wherein the selection unit selects the target content item from the plurality of content items whose elevation angles are within a predetermined range.

For example, the content selection apparatus may further include a text information extraction unit that extracts text information from a content item that includes text from among the plurality of content items, the text information relating to the text, wherein the selection unit selects, as the target content item, the content item from which the text information is extracted from among the plurality of content items, in the case where the selection mode switching unit switches the selection mode to a fifth selection mode different from the first selection mode.

For example, the selection unit may select, as the target content item, the content item from which the text information indicating a size of the text smaller than a predetermined value is extracted.

For example, the selection unit may select, as the target content item, the content item from which the text information indicating a size of the text larger than a predetermined value is extracted.

With this structure, a content item including text information is selected as the target content item. A work content item created using such content items can thus be presented to the user.

For example, the content selection apparatus may further include a communication unit that receives a creation rule from a server provided outside the content selection apparatus, the creation rule being information that indicates a creation method for a work content item made up of a plurality of target content items and includes a selection method for the target content item, wherein the selection unit selects the target content item according to the selection method indicated in the creation rule received by the communication unit.

With this structure, a work content item can be automatically created by a new creation method obtained from an external apparatus. This enables provision of such a work content item that keeps the user enjoying an element of surprise of content items in various styles.

For example, the content selection apparatus may further include a rule storage unit that stores creation rule information that associates the creation rule with execution information indicating whether or not the work content item is created using the creation rule, wherein the selection unit selects the target content item according to a selection method indicated in, from among the creation rule included in the creation rule information, a creation rule associated with execution information indicating that the work content item is not created using the creation rule.

With this structure, a work content item can be created based on a creation rule that has not been used for work content creation previously.

For example, the plurality of content items may be still images or moving images.

For example, the content selection apparatus may create any of an album, a slideshow, and a short movie using the plurality of target content items, as the work content item.

For example, each of the plurality of content items may include information relating to a creation date of the content item, wherein the selection unit selects the target content item from the plurality of content items whose creation dates are within a predetermined period.

With this structure, a content item captured in a predetermined period is selected as the target content item.

For example, each of the plurality of content items may include information relating to a creation location of the content item, wherein the selection unit selects the target content item from the plurality of content items whose creation locations are within a predetermined range.

With this structure, a content item captured in a location in a predetermined range can be selected as the target content item.

For example, the content selection apparatus may further include a storage unit that stores selection history information relating to each content item selected when creating the work content item, wherein the selection unit selects the target content item from the plurality of content items whose frequencies of being selected when creating the work content item are less than or equal to a predetermined value, based on the selection history information.

With this structure, a content item having a low frequency of being selected for work content creation previously can be selected as the target content item.

These general and specific aspects may be implemented using a system, a method, an integrated circuit, a computer program, or a computer-readable recording medium such as a CD-ROM, or any combination of systems, methods, integrated circuits, computer programs, and recording media.

The following describes embodiments of the present invention with reference to drawings. Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the present invention. Accordingly, among the structural elements in the embodiments described below, the structural elements not recited in any one of the independent claims representing the broadest concepts are described as arbitrary structural elements.

A content selection apparatus according to each of the embodiments described below is capable of appropriately selecting a content item to present a content item that delivers unexpected value to the user.

A content item that delivers unexpected value to the user is, for example, (1) a content item that has a low frequency of being viewed by the user and can be of interest to the user, or (2) a plurality of content items compiled from a perspective that is usually not applied to viewing by the user. The content selection apparatus according to the present invention can present a content item corresponding to any of the above-mentioned (1) and (2).

Embodiment 1

A content selection apparatus according to Embodiment 1 selects, from folders including content items, each folder with a small number of content items, and automatically creates a new work content item using content items included in the selected folders. The work content item mentioned here is a new content item created from a plurality of content items. Examples of the work content item include an album, a slideshow, and a short movie.

The number of content items included in a folder tends to vary depending on whether or not these content items are captured in a major event (e.g. an important event, a long-term event).

For instance, several tens to hundreds of photographs and several movies are taken in a major event such as a travel, a school event for a child, and the like. In the case where the content items are sorted (classified) into folders on a capture date basis or on an event basis, a large number of content items are included in a folder corresponding to the capture date or the event as mentioned above.

On the other hand, when the user captures scenery or a thing which the user comes across in daily life, the number of photographs is one to several. In the case where the content items are sorted into folders on a capture date basis or on an event basis, a small number of photographs from one to several are included in a folder corresponding to the capture date or the event.

Upon looking back content items, the user tends to pay attention to the major event, and is unlikely to pay attention to content items capturing daily life and look back such content items.

In view of this, the content selection apparatus according to Embodiment 1 selects "content items capturing daily life" and creates a new work content item made up of the selected content items.

By presenting such a work content item to the user, the user can look back objects of interest which he or she happened to notice in daily life, and also enjoy making a new discovery about the user or his or her surroundings.

That is, the content selection apparatus according to Embodiment 1 selects "content items capturing daily life" which the user tends not to look back, as content items that deliver unexpected value to the user. The content selection apparatus according to Embodiment 1 can thus present a work content item created using such content items to the user.

FIG. 1 is a block diagram showing a functional structure of the content selection apparatus according to Embodiment 1.

As shown in FIG. 1, a content selection apparatus 100 includes a storage unit 101, a determination unit 102, a selection unit 103, a creation unit 104, a display unit 105, and a loading unit 106.

The storage unit 101 stores, for example, files of content items such as still images (photographs) and a file including information for managing the content items. For example, in the case where the content items are managed using folders, the information for managing the content items is metadata relating to the folders. The following description is based on an assumption that the information for managing the content items is the metadata relating to the folders, as an example.

The content items recorded in the storage unit 101 are loaded by the loading unit 106 using a storage medium such as a memory card removed from an imaging device or a communication cable such as a USB (Universal Serial Bus) cable. The metadata is newly created when a content item is first recorded in the storage unit 101 and a folder is created to manage the content item. The metadata is changed when, in a state where one or more content items are already recorded in the storage unit 101, a content item is added or deleted and as a result a folder is added or deleted. The loading unit 106 may load the content items from the imaging device or another content management apparatus via a communication unit not shown.

The storage unit 101 is described in detail below, with reference to FIGS. 2 and 3.

Figure 2:
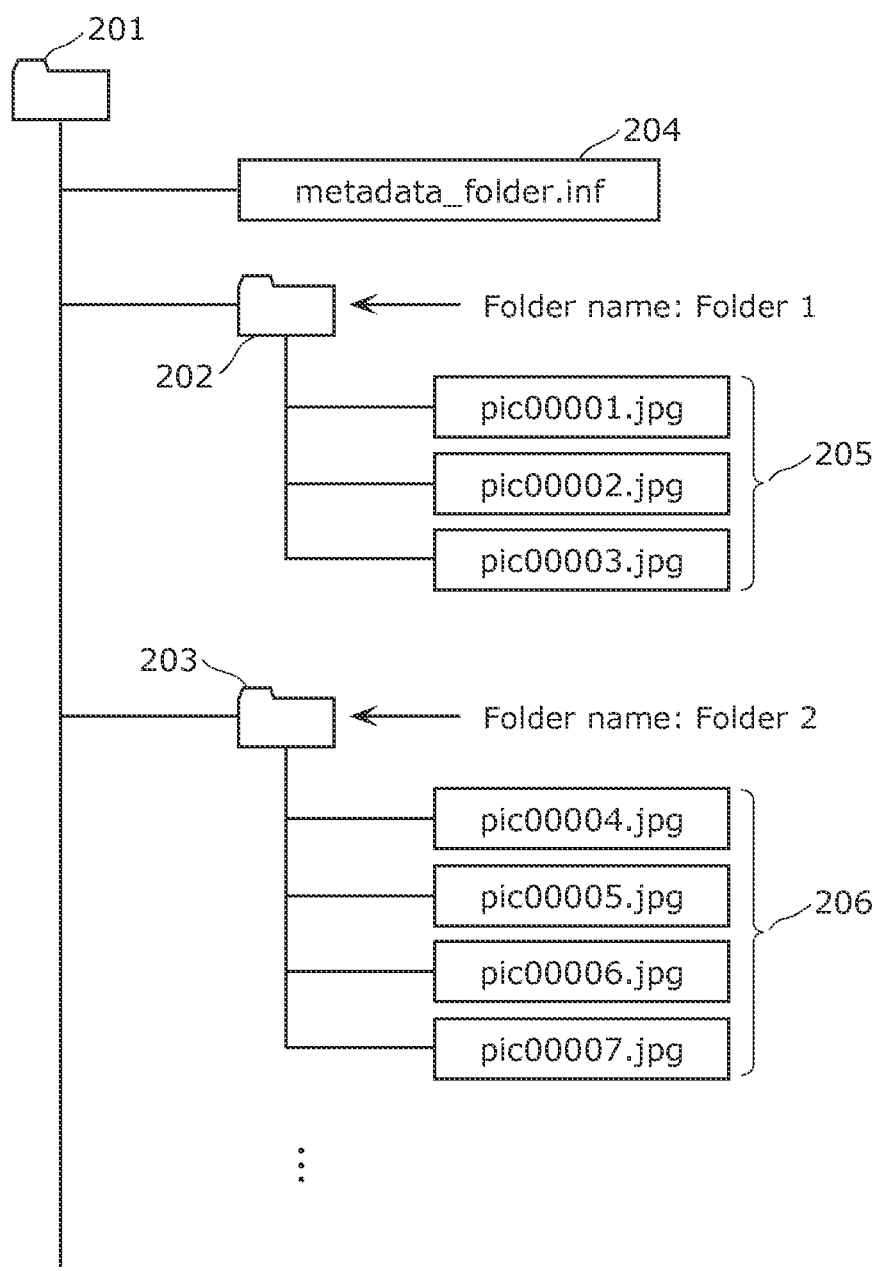
FIG. 2 is a diagram showing an example of folder-based content management in a storage unit.

FIG. 2 is a diagram showing an example of folder-based content management in the storage unit 101.

In Embodiment 1, the content items are recorded in a folder structure using a tree structure, and content management is carried out in a system in which a folder includes one or more content items and one or more lower level folders. Note that the content management system is not limited to the tree structure described here, and may be any system that has the same advantageous effects.

In FIG. 2, a folder 201 is a highest level folder. Folders 202 and 203 (with folder names "folder 1" and "folder 2" respectively) and a folder metadata file 204 including metadata relating to the folders are stored directly below the folder 201.

The folder 202 includes one or more actually captured content items 205. In FIG. 2, the content items 205 represent three still image content items (with file names "pic00001.jpg", "pic00002.jpg", and "pic00003.jpg" respectively).

Likewise, the folder 203 includes one or more content items 206. The content items 206 represent four still image content items with file names "pic00004.jpg", "pic00005.jpg", "pic00006.jpg", and "pic00007.jpg" respectively).

Though the folders 202 and 203 and the content items 205 and 206 are shown in FIG. 2 as an example, much more folders and content items are recorded in actuality.

FIG. 3 is a diagram showing an example of a data structure of the folder metadata file 204.

In the example in FIG. 3, the folder metadata file 204 includes, for each folder, a folder ID 301, a folder name 302, number of content items 303, an earliest capture date and time 304, and a latest capture date and time 305 in association with each other.

The folder ID 301 is an ID for uniquely identifying the folder managed in the storage unit 101. In the example in FIG. 3, the folder ID is a character string in which "FLD" is followed by a 5-digit serial number assigned in the order in which the folders are created in the content selection apparatus 100.

The number of content items 303 indicates the number of content items included in the folder. The earliest capture date and time 304 indicates the capture date and time of a content item captured at an earliest date and time from among the content items included in the folder. The latest capture date and time 305 indicates the capture date and time of a content item captured at a latest date and time from among the content items included in the folder.

The description returns to the functional structure shown in FIG. 1.

The determination unit 102 determines whether or not work content creation is allowed. As an example, in the case where a process of higher priority than the work content creation process is being performed upon start of the process by the determination unit 102, the determination unit 102 determines that work content creation is not allowed. As another example, in the case where a resource such as a CPU or a memory in the content selection apparatus 100 is occupied to a predetermined amount or more upon start of the process by the determination unit 102, the determination unit 102 determines that work content creation is not allowed.

In detail, for example in the case where the content selection apparatus 100 is realized as an HDD recorder, a television program timer recording process is given higher priority than the work content creation process. Moreover, for example in the case where a process of higher priority is scheduled to start during the work content creation process, the determination unit 102 determines that work content creation is not allowed. The operation of the determination unit 102 will be described in detail later.

The selection unit 103 selects each content item used in a work content item, based on a predetermined condition. The operation of the selection unit 103 will be described in detail later.

The creation unit 104 creates a work content item using the content items selected by the selection unit 103. An example of the content item created by the creation unit 104 is a slideshow movie simply by displaying the content items selected by the selection unit 103 in order of capture date and time. Another example of the content item created by the creation unit 104 is a slideshow movie by combining the content items selected by the selection unit 103 with background data, music data, display effects, transition effects, and the like.

The display unit 105 displays the work content item created by the creation unit 104. The display unit 105 may also display a user interface for operating the content selection apparatus 100, and the content items for creating the work content item.

The loading unit 106 loads the content items for creating the work content item. As an example, the loading unit 106 loads the content items from a storage medium such as a memory card removed from the imaging device. As another example, the loading unit 106 loads the content items from outside the content selection apparatus, using a communication cable such as a USB cable.

The operations of the determination unit 102 and the selection unit 103 are described in detail below, with reference to FIGS. 4 and 5.

In Embodiment 1, the determination unit 102 determines whether or not to create a work content item "monthly look back slideshow" using content items of one month. The work content item "monthly look back slideshow" is hereafter referred to as "monthly look back content item".

Figure 4:
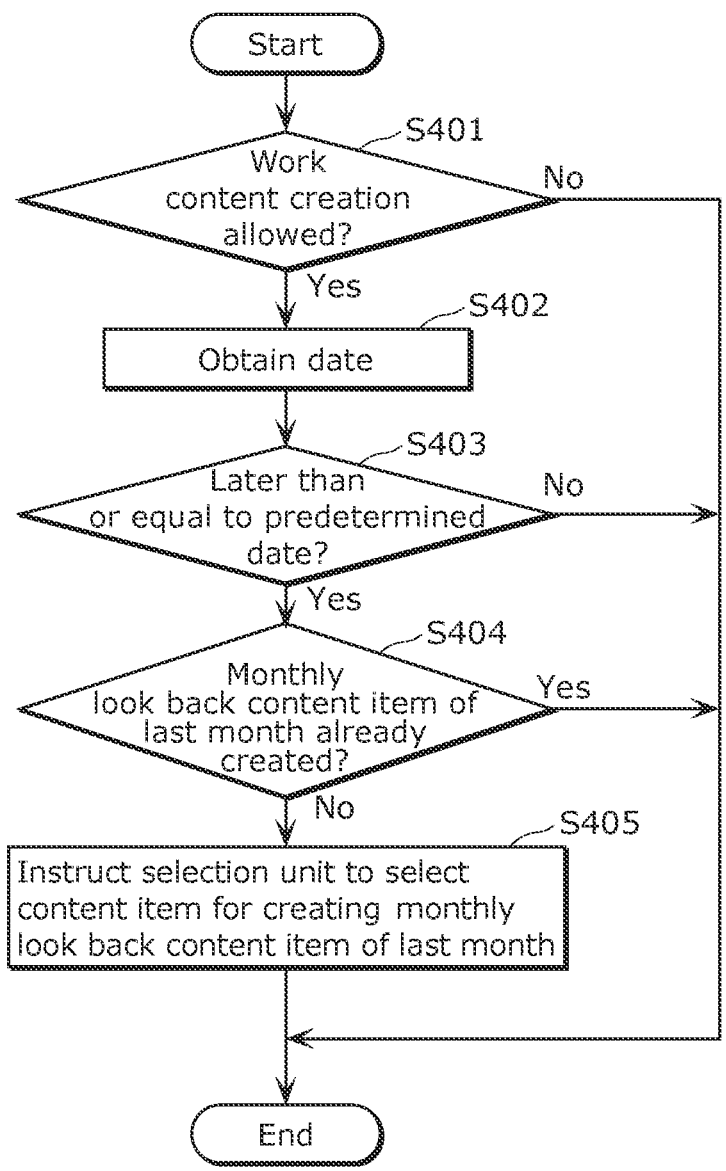
FIG. 4 is a flowchart showing an example of an operation of a determination unit according to Embodiment 1.

FIG. 4 is a flowchart showing an example of the operation of the determination unit 102.

The determination process by the determination unit 102 shown in FIG. 4 is started at a predetermined timing. In Embodiment 1, the predetermined timing is immediately after the power button of the content selection apparatus 100 is pressed and the content selection apparatus 100 enters the standby state. However, the determination process by the determination unit 102 may be started when the current time reaches a predetermined time, regardless of whether or not the content selection apparatus 100 is in the standby state.

First, the determination unit 102 determines whether or not the content selection apparatus 100 is in a state where work content creation is allowed, based on the above-mentioned criterion (Step S401). In the case where the determination unit 102 determines that work content creation is not allowed (Step S401: No), the determination unit 102 ends the determination process without performing the subsequent process.

In the case where the determination unit 102 determines that work content creation is allowed (Step S401: Yes), the determination unit 102 obtains the date on which the determination process is started (Step S402). For example, in the case where the content selection apparatus 100 has system time, the date may be calculated based on the system time. Alternatively, the determination unit 102 may obtain information about the date from another apparatus connected to the content selection apparatus 100.

The determination unit 102 then determines whether or not the obtained date is later than or equal to a predetermined date in the month to which the date belongs (Step S403).

In Embodiment 1, the predetermined date is the 7th day of each month. Here, the predetermined date is set to not the 1st day of each month but the 7th day of each month, in order to prevent the following situation: in the case where the predetermined date is the 1st day of each month, the monthly look back content item is created without any content item captured at about the end of the immediately preceding month being loaded into the content selection apparatus 100 and as a result the content item captured at about the end of the immediately preceding month is left out of the monthly look back content item.

Thus, by taking into account the number of days within which the user is likely to load the content item captured at about the end of the immediately preceding month into the content selection apparatus 100, the predetermined date is set to the 7th day of each month in Embodiment 1. The predetermined date is, however, not limited to this example, and may be the 3rd day of each month, the 10th day of each month, or the 1st day of each month. In the case where the obtained date is earlier than the predetermined date in Step S403, the determination unit 102 ends the determination process.

In the case where the obtained date is later than or equal to the predetermined date in Step S403 (Step S403: Yes), the determination unit 102 determines whether or not the monthly look back content item of the month (last month) immediately preceding the month to which the obtained date belongs has already been created (Step S404).

Step S404 is performed in order to prevent the following situation: for example in the case where monthly look back content creation is not allowed because of a process higher in priority than the work content creation process as mentioned above, the monthly look back content item remains uncreated. Whether or not the monthly look back content item has already been created is determined by, for instance, reading the creation history recorded in the storage unit 101 together with the monthly look back content item when the creation unit 104 creates the monthly look back content item.

In the case where the monthly look back content item of the last month has already been created in Step S404 (Step S404: Yes), the determination unit 102 ends the determination process.

In the case where the monthly look back content item of the last month has not been created in Step S404 (Step S404: No), the determination unit 102 instructs the selection unit 103 to select each content item for creating the monthly look back content item of the last month (Step S405), and ends the determination process.

Figure 5:
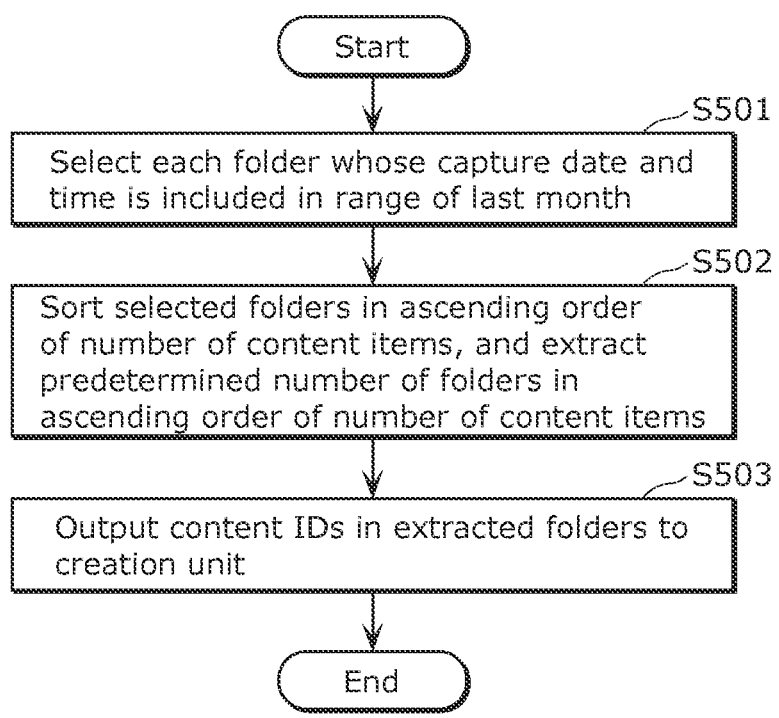
FIG. 5 is a flowchart showing an example of an operation of a selection unit according to Embodiment 1.

FIG. 5 is a flowchart showing an example of the operation of the selection unit 103.

Having received the instruction to select each content item for creating the monthly look back content item of the last month from the determination unit 102 in Step S405 in FIG. 4, the selection unit 103 selects each folder whose content capture date and time is included in the range of the last month, by referring to the folder metadata file 204 (Step S501).

The selection unit 103 then sorts the selected folders in ascending order of the number of content items included in the folder, and extracts a predetermined number of folders in ascending order of the number of content items (Step S502).

For example, in the case where the predetermined number is 5 and the number of folders selected in Step S501 is 20, five folders are extracted in ascending order of the number of content items included in the folder.

In the case where the number of folders selected in Step S501 is less than or equal to the predetermined number, on the other hand, all folders selected in Step S501 are extracted. For example, in the case where the predetermined number is 5 and the number of folders selected in Step S501 is 3, all three folders are extracted.

Thus, though Step S502 is described as the process of selecting the predetermined number of folders, the number of folders extracted in Step S502 may be less than or equal to the predetermined number depending on the number of folders selected in Step S501.

Though the predetermined number is 5 in Embodiment 1, the predetermined number may be a number other than 5 according to a total number of folders or a total number of content items in the month subject to monthly look back content creation (target month).

Lastly, the selection unit 103 obtains content IDs of content items in the extracted folders, and outputs the content IDs to the creation unit 104 (Step S503). A content ID mentioned here is information for identifying a content item, such as an identifier unique to the content item in the storage unit 101 or a file path in the tree structure.

The operations shown in FIGS. 4 and 5 are described in more detail below. In the following specific example, it is assumed that the content items are stored in the storage unit 101 in the folder structure as shown in FIG. 3. It is also assumed that the content selection apparatus 100 enters the standby state after the user uses the content selection apparatus 100 on Nov. 7, 2011, and there is no other process of higher priority in the content selection apparatus 100.

Having entered the standby state, the content selection apparatus 100 starts the determination process by the determination unit 102. First, the determination unit 102 determines whether or not work content creation is allowed (Step S401 in FIG. 4). There is no process of higher priority in this specific example, so that the determination unit 102 determines that work content creation is allowed (Step S401 in FIG. 4: Yes).

The determination unit 102 then obtains the date (Step S402 in FIG. 4). The date of November 7 obtained by the determination unit 102 is later than or equal to the predetermined date (Step S403 in FIG. 4: Yes). Since the current determination process is the first process after the obtained date is determined to be later than or equal to the predetermined date, the monthly look back content item of the last month (October) has not been created (Step S404 in FIG. 4: No). The determination unit 102 accordingly instructs the selection unit 103 to select each content item for creating the monthly look back content item (Step S405 in FIG. 4).

The selection unit 103 selects each folder whose capture date and time is included in the range of October (Step S501 in FIG. 5). In the example in FIG. 3, eight folders of the folder IDs FLD00002 to FLD00009 are selected.

The selection unit 103 then sorts the folders in ascending order of the number of content items, and extracts five folders in ascending order of the number of content items (Step S502 in FIG. 5). In the example in FIG. 3, five folders of the folder IDs FLD00004, FLD00006, FLD00009, FLD00005, and FLD00002 are extracted.

The selection unit 103 obtains content IDs of content items included in these folders, and outputs the content IDs to the creation unit 104 (Step S503 in FIG. 5).

Having received the content IDs from the selection unit 103, the creation unit 104 obtains the content items identified by the received content IDs, and creates a slideshow movie by combining the obtained content items with background data, music data, display effects, transition effects, and the like stored in the storage unit 101. The creation unit 104 records the content file of the created slideshow movie and the creation history of the monthly look back content item of October 2011, in the storage unit 101.

Thus, the content selection apparatus 100 according to Embodiment 1 selects, from the content folders including content items, the predetermined number of folders in ascending order of the number of content items, and automatically creates the new work content item using the content items included in the selected folders.

This enables the user to collectively view "content items capturing daily life" which the user tends not to look back often. Hence, the user can look back an object of interest which he or she happened to notice in daily life, and enjoy making a new discovery about the user or his or her surroundings.

In Embodiment 1, the selection unit 103 obtains content IDs of all content items included in the predetermined number of folders selected in ascending order of the number of content items. Here, the selection unit 103 may set an upper limit on the number of content IDs obtained from each folder, and may set an upper limit on the total number of obtained content IDs.

In the case where most folders in the target month are folders with a large number of content items, the total number of content items whose content IDs are to be obtained is large, making the created slideshow movie very long. The user may get tired of viewing such a work content item halfway, unable to look back content items effectively. Setting the upper limit on the number of obtained content IDs effectively prevents this situation.

Moreover, the content selection apparatus 100 may select folders in descending order of the number of content items.

As mentioned earlier, a content folder with a large number of content items is likely to include content items captured in a major event. The user tends to look back these content items on an event basis, in view of this, instead of fine content presentation to the user on an event basis, a monthly look back content item may be created by, for example, selecting a predetermined number of content items captured in each major event in one month or one year so that the user can "look back in a digest form what events took place".

In this case, in Step S502, the selection unit 103 sorts the selected folders in descending order of the number of content items included in the folder, and extracts a predetermined number of folders in descending order of the number of content items. Here, the number of extracted folders may be less than or equal to the predetermined number depending on the number of folders selected in Step S501, as mentioned above.

This enables the user to look back in a digest form the events taking place in the period subject to work content creation, the growth of the user and his or her family, the changes in his or her surroundings, and so on.

Moreover, the content selection apparatus 100 may, upon detecting that a new monthly look back content item is recorded in the storage unit 101, display an icon notifying the user of the creation of the monthly look back content item on a startup screen or a menu screen of the display unit 105. The content selection apparatus 100 may then reproduce the monthly look back content item via the display unit 105, when the user selects the icon displayed on the display unit 105 or selects the content item from a content list screen. In this way, the user can be notified of the creation of the new monthly look back content item upon activating the content selection apparatus 100 next time.

Embodiment 2

A content selection apparatus according to Embodiment 2 detects objects shown in content items recorded in the storage unit, calculates an importance level of each detected object, and automatically creates a new work content item using content items in which objects low in importance level are shown.

Take, for example, a human face as an object. Content items often show various human faces. These human faces include a human face intentionally captured and a human face shown without the user's intention. Examples of the human face intentionally captured are the faces of the family or friends.

When looking back content items, the user tends to mainly look back content items showing the family or friends. These content items showing the family or friends can be regarded as content items showing objects high in importance level to the user, from the user's high interest on the content items and deep disappointment when the content items are lost.

Meanwhile, content items do not necessarily show only those close to the user such as the family or friends. A content item may show a person who is familiar but whom the user does not particularly recall capturing, a person who is not very familiar, or a person whom the user does not know at all. A content item may also show a photograph or an illustration of a person on a sign or the like, or a wall pattern that looks like a human face.

These "persons shown without the user's intension (including things that look like persons)" are objects which the user does not pay attention to and is unlikely to take notice of. When viewing content items in order to look back events, these objects can be regarded as low in importance level.

However, by compiling content items showing such objects of low importance levels into a new work content item and presenting it to the user, the user can enjoy an element of surprise from the content items, such as "I never thought I'd find him here", "Who is this person pictured large?", or "Funny this pattern looks like a human face".

The content selection apparatus according to Embodiment 2 selects the above-mentioned content items having an element of surprise to the user, as content items that deliver unexpected value to the user. The content selection apparatus according to Embodiment 2 can thus present a work content item created using such content items to the user.

Figure 6:
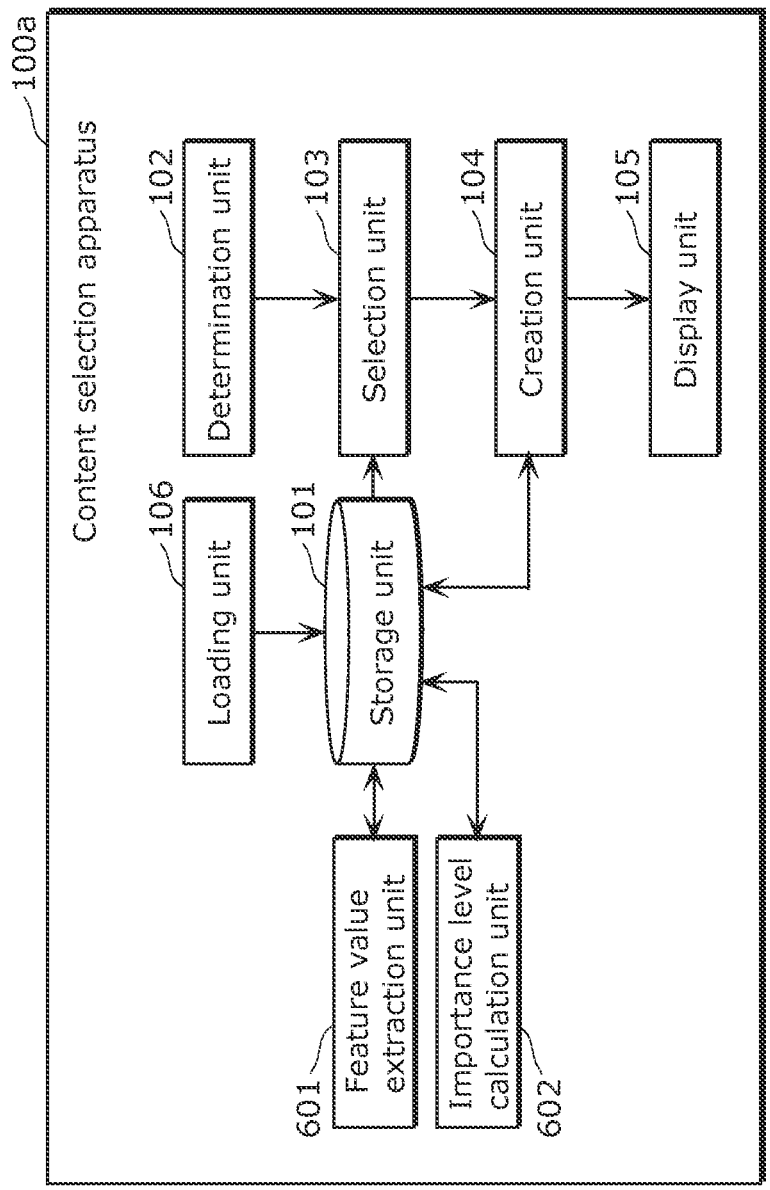
FIG. 6 is a block diagram showing a functional structure of a content selection apparatus according to Embodiment 2.

FIG. 6 is a block diagram showing a functional structure of the content selection apparatus according to Embodiment 2. The difference from the content selection apparatus 100 according to Embodiment 1 lies in that a content selection apparatus 100*a* according to Embodiment 2 further includes a feature value extraction unit 601 and an importance level calculation unit 602.

The feature value extraction unit 601 is described first.

The feature value extraction unit 601 detects an object shown in a content item, and extracts a feature value of the detected object. In Embodiment 2, the feature value extraction unit 601 detects, as an example of the object, whether or not a human face is shown in the content item.

For instance, when recording the content tem in the storage unit 101 via the loading unit 106, the content selection apparatus 100*a* reads capture date and time information from associated information (e.g. EXIF information in the case of photographs) associated with the content item, and updates a content metadata file as shown in FIG. 7. In addition to updating the content metadata file, the content selection apparatus 100*a* starts the extraction process by the feature value extraction unit 601 to detect whether or not a human face is shown in the loaded content item.

The feature value extraction unit 601 first detects, for each loaded content item, whether or not a human face is shown in the content item. In the case where a human face is shown in the content item, the feature value extraction unit 601 extracts a feature value of the face, and records the feature value in the content metadata file in association with the content item.

A face feature value extraction technique of extracting a feature value of a human face and a face area detection technique of detecting whether or not a human face is shown in a content item are well known, and so their detailed description is omitted. Examples of the face feature value include the distance between the eyes, the width of the nose, and the pattern distribution of facial color or brightness. For face area detection, a discriminator such as an SVM (Support Vector Machine) or AdaBoost may be used with these feature values as input.

FIG. 7 is a diagram showing an example of a data structure of the content metadata file.

In the example in FIG. 7, the content metadata file includes, for each content item, a content ID 701, a content filename 702, a folder ID 301, a capture date and time 703, an object ID 704, an object area 705, and an object feature value 706 in association with each other.

The content ID 701 is an ID for identifying the content item in the storage unit 101. In detail, the content ID 701 is a character string in which "CNT" is followed by a serial number assigned in the order in which the content items are recorded in the storage unit 101.

The filename 702 is the filename of the content item. The folder ID 301 is an ID for identifying a folder including the content item, as in Embodiment 1. The capture date and time 703 is the capture date and time of the content item.

The object ID 704 is an ID for identifying an object (human face in this embodiment) detected in the content item. In detail, the object ID 704 is a character string in which "OBJ" is followed by a serial number assigned in the order in which the objects are detected by the feature value extraction unit 601.

The object area 705 is coordinates indicating the position and area size of the detected object in the content image. The object feature value 706 is a value indicating the feature value of the object.

In the content metadata file, the object ID 704, the object area 705, and the object feature value 706 are not recorded in the case where no human face is detected in the content item by the feature value extraction unit 601. In the example in FIG. 7, the content item whose content ID 701 is CNT00002 is a content item in which no human face is shown.

In the case where a plurality of human faces are determined to be shown in one content item, on the other hand, object IDs 704, object areas 705, and object feature values 706 corresponding in number to the detected faces are recorded in association with one content ID. In the example in FIG. 7, the content item whose content ID 701 is CNT00003 is a content item in which a plurality of human faces are shown. In the folder structure shown in FIG. 2, the content metadata file is stored in the same level (directly below the highest level folder 201) as the folder metadata file 204.

The object area 705 is described below, with reference to FIG. 8.

Figure 8:
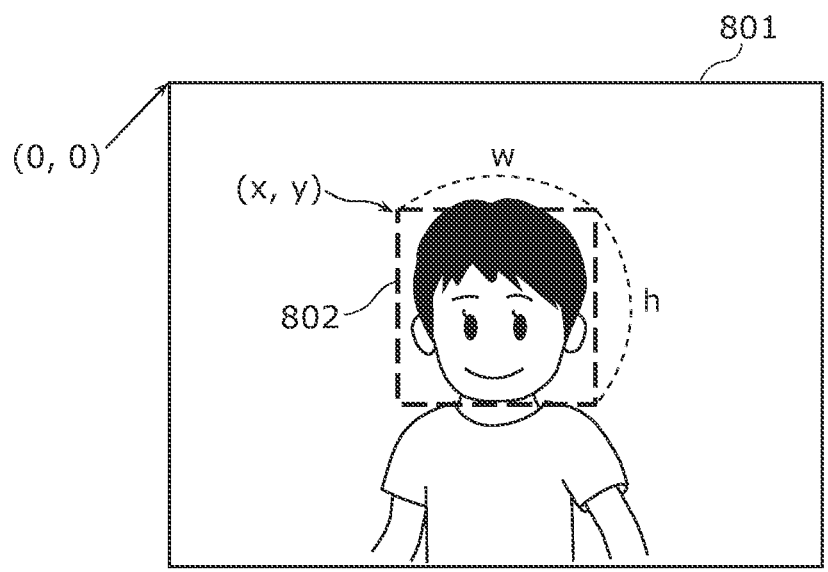
FIG. 8 is a diagram showing an example of an object area.

FIG. 8 is a diagram showing an example of the object area.

When a human face is detected in a content item 801 by the feature value extraction unit 601, the detected human face is treated as an object indicated by a frame 802. The feature value extraction unit 601 records the values (x, y, w, h) where the top left of the content item 801 is the origin (0, 0) of an x-y coordinate system, the coordinates of the top left of the frame 802 are (x, y) in the coordinate system, and the width and height of the frame 802 are (w, h), in the content metadata file as the object area 705. Though the frame 802 is a rectangle in the example in FIG. 8, the frame may be a circle, a polygon, or any other shape. Moreover, the frame 802 may be shaped along the outline of the face.

The importance level calculation unit 602 is described next.

The importance level calculation unit 602 classifies objects into groups of similar objects based on feature values extracted by the feature value extraction unit 601, determines an importance level for each group of objects, and assigns the importance level to the objects. The group of objects classified as similar to each other is hereafter referred to as "cluster".

The operation of the importance level calculation unit 602 is described below, with reference to FIGS. 9 and 10.

Figure 9:
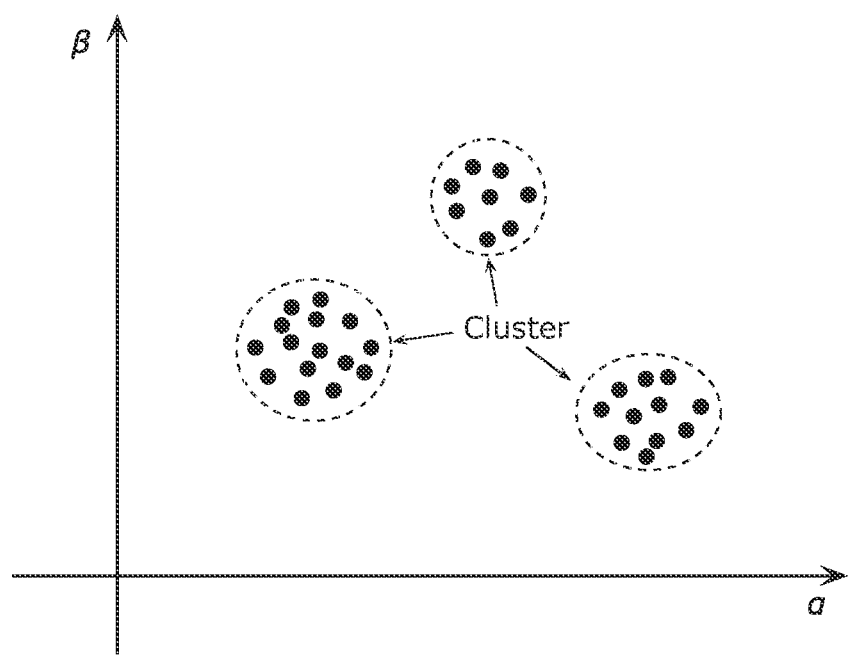
FIG. 9 is a diagram showing an example of a clustering process.

FIG. 9 is a diagram showing an image of a clustering process in which the importance level calculation unit 602 groups similar objects.

The vertical and horizontal axes in FIG. 9 represent part (assumed here to be α·β) of the object feature value 706 of each object. The points in the drawing represent objects, which are each plotted at the position corresponding to its feature value. Though the object feature value 706 is two-dimensional in FIG. 9 due to space limitations, the object feature value 706 is typically a vector having a plurality of values as components, exceeding several tens of dimensions. The dotted lines in the drawing represent clusters. Objects enclosed by one dotted line belong to the same cluster.

For example, clustering is performed by K-means. K-means is a method in which a representative value of each of K clusters (a predetermined number of clusters) is determined based on the object feature value 706 of each object, and each object is classified based on the difference between the representative value and the object feature value 706. By K-means, objects with close object feature values 706 are classified into the same cluster as shown in FIG. 9.

FIG. 10 is a diagram showing an example of a data structure of cluster information.

As shown in FIG. 10, the cluster information includes a cluster ID 1001, an object ID 704, number of objects in cluster 1002, and an importance level 1003.

The cluster ID 1001 is an ID for uniquely identifying a cluster. In detail, the cluster ID 1001 is a character string in which "CLS" is followed by a 4-digit serial number assigned in the order in which the clusters are created in the clustering process by the importance level calculation unit 602.

The object ID 704 is an object ID of an object included in the cluster. The number of objects in cluster 1002 is the number of objects included in the cluster.

The importance level 1003 is described in detail below.

In Embodiment 2, the importance level calculation unit 602 regards a cluster with a larger number of objects in cluster 1002 as higher in importance level, and assigns an importance level to each cluster in descending order of the number of objects in cluster 1002.

In detail, the importance level calculation unit 602 assigns an importance level 1 to a cluster with a largest number of objects in cluster 1002, and ranks, as an importance level, the remaining clusters in descending order of the number of objects in cluster 1002 (clusters with the same number of objects in cluster 1002 are ranked equal).

The reason for assigning such importance levels is as follows. Each cluster basically represents one person's face. Accordingly, a cluster with a large number of objects suggests that there are many content items capturing a person corresponding to the duster.

For example, the number of content items capturing an important person such as "a child in the family" tends to be large in the storage unit 101 in the content selection apparatus 100a. Hence, in Embodiment 2, the importance level calculation unit 602 assigns the importance level in the above-mentioned manner based on the definition that a cluster with a large number of objects in cluster 1002 is important.

Though the importance level is assigned based only on the number of objects in cluster 1002 in the above example, the importance level may be assigned by further taking into account the frequency of being shown together with an object that belongs to another cluster.

A person who is sometimes shown together with the important person, such as "the child's parent or grandparent" shown together with "the child in the family", is likely to be an important person for the family. Therefore, content items showing "the child's parent or grandparent" can be regarded as high in importance level, even if they are not many in number.

The importance level calculation unit 602 may also assign the importance level based on information explicitly input by the user. For example, the importance level calculation unit 602 may use, as the importance level, a favorite level assigned to each cluster by the user via an interactive user interface of the content selection apparatus 100a. Alternatively, the importance level calculation unit 602 may assign a higher importance level to a cluster to which the user attaches a name (e.g. the child's name).

The operations of the determination unit 102 and the selection unit 103 according to Embodiment 2 are described below, with reference to FIGS. 11 and 12.

The content selection apparatus 100a (the loading unit 106), having loaded new content items such as photographs or movies, sorts the loaded content items into folders according to the capture date of each content item. The creation unit 104 in the content selection apparatus 100a then automatically creates a work content item "folder-based slideshow" for each folder, using the content items included in the folder. In the case where no content item is newly loaded even after a predetermined time has elapsed from the last creation of the folder-based slideshow, the creation unit 104 in the content selection apparatus 100a automatically creates a work content item "person look back slideshow" using content items in which persons low in importance level are shown. The work content item "person look back slideshow" is hereafter referred to as "person look back content item".

Figure 11:
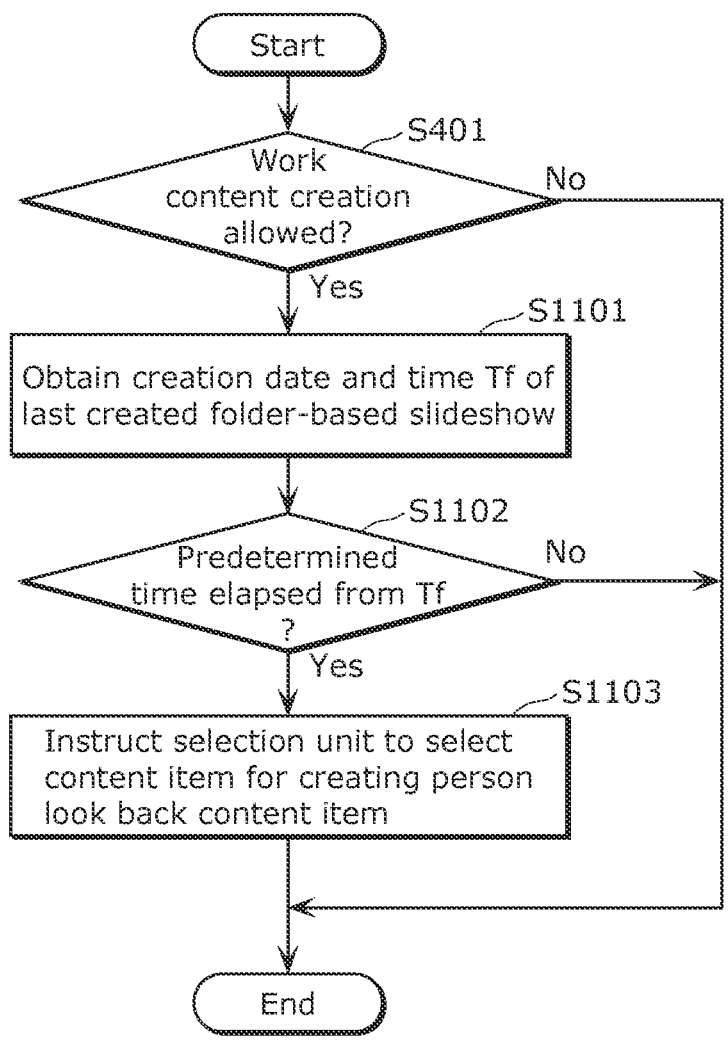
FIG. 11 is a flowchart showing an example of an operation of a determination unit according to Embodiment 2.

FIG. 11 is a flowchart showing an example of the operation of the determination unit 102.

The determination process by the determination unit 102 shown in FIG. 11 is started at a predetermined timing. In Embodiment 2, the predetermined timing is immediately after the power button of the content selection apparatus 100a is pressed and the content selection apparatus 100a enters the standby state. However, the determination process by the determination unit 102 may be started when the current time reaches a predetermined time, regardless of whether or not the content selection apparatus 100a is in the standby state.

First, the determination unit 102 determines whether or not the content selection apparatus 100a is in a state where work content creation is allowed (Step S401). This process has been described in Embodiment 1, and so its description is omitted. In the case where the determination unit 102 determines that work content creation is not allowed (Step S401: No), the determination unit 102 ends the determination process without performing the subsequent process.

In the case where the determination unit 102 determines that work content creation is allowed (Step S401: Yes), the determination unit 102 obtains the creation date and time Tf of the last created folder-based slideshow (Step S1101), and determines whether or not a predetermined time has elapsed from the creation date and time Tf (Step S1102). In Embodiment 2, the predetermined time is 100 hours. The creation date and time Tf can be obtained from timestamp information at the time of file creation of the folder-based slideshow.

In the case where the predetermined time has not elapsed from the creation date and time Tf in Step S1102 (Step S1102: No), the determination unit 102 ends the determination process.

In the case where the predetermined time has elapsed from the creation date and time Tf (Step S1102: Yes), the determination unit 102 instructs the selection unit 103 to select each content item for creating the person look back content item (Step S1103), and ends the determination process.

Figure 12:
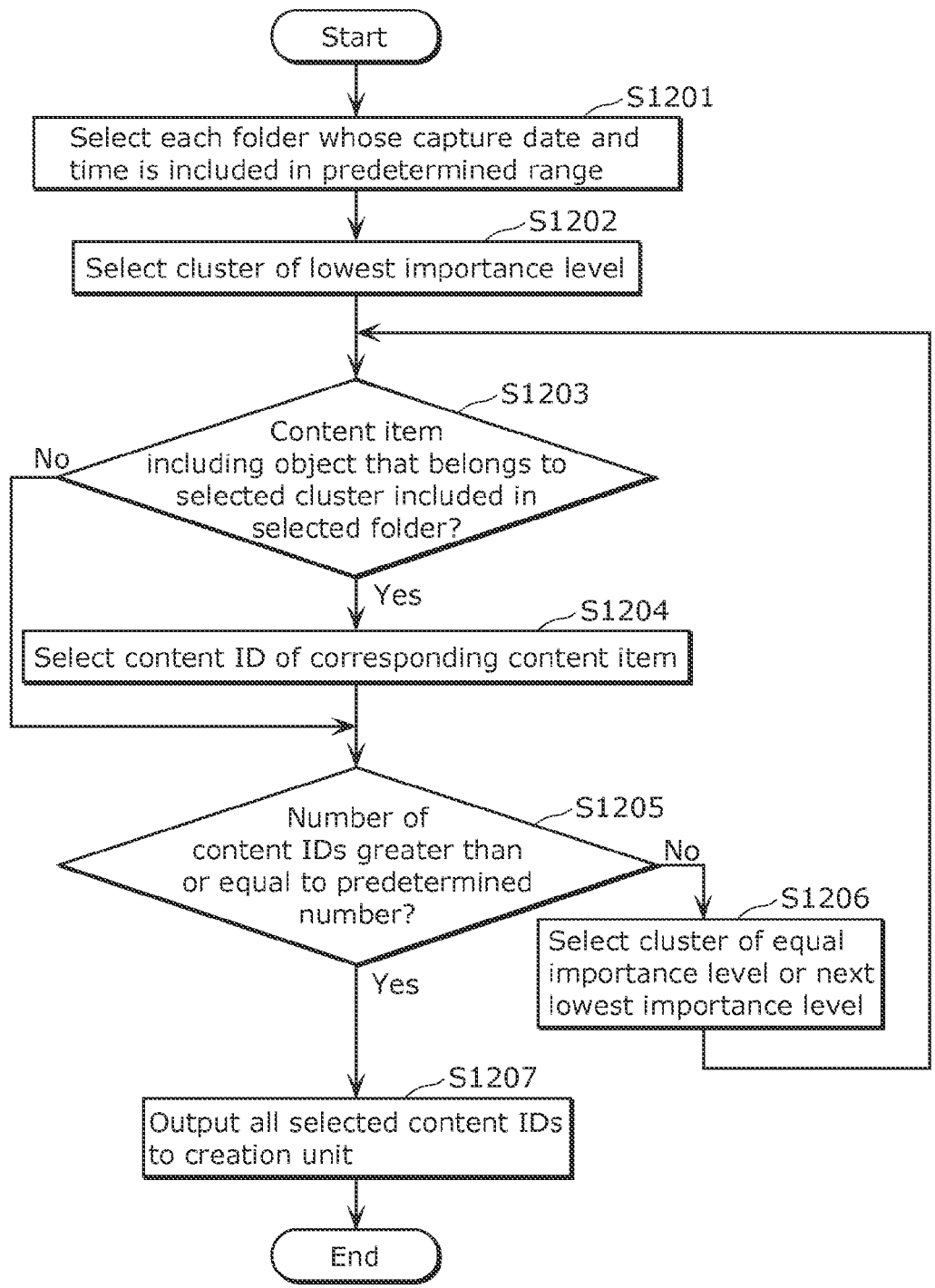
FIG. 12 is a flowchart showing an example of an operation of a selection unit according to Embodiment 2.

FIG. 12 is a flowchart showing an example of the operation of the selection unit 103.

Having received the instruction to select each content item for creating the person look back content item from the determination unit 102 in Step S1103 in FIG. 11, the selection unit 103 selects each folder whose content capture date and time is included in a predetermined range, by referring to the folder metadata file 204 (Step S1201). In Embodiment 2, the predetermined range is 15 days in total that are made up of, as a reference date, the date 60 days ago from the date on which the selection process by the selection unit 103 is performed and 7 days before and after the reference date.

This range is set in order to remind the user of the existence of the content items, given that after about two months the user tends to forget what he or she captured. The predetermined range is, however, not limited to this. Note that, in the case where there is no folder whose content capture date and time is included in the predetermine range, the selection unit 103 ends the selection process.

The selection unit 103 then selects a cluster of a lowest importance level, by referring to the cluster information (FIG. 10) (Step S1202). In the case where there are a plurality of clusters of the lowest importance level, the selection unit 103 selects a cluster of a smallest cluster ID, as an example. As another example, in the case where there are a plurality of clusters of the lowest importance level, the selection unit 103 may select one cluster randomly from the plurality of clusters, or select a predetermined number (greater than or equal to 2) of clusters. Alternatively, the selection unit 103 may select all clusters of the lowest importance level.

Following this, the selection unit 103 checks whether or not a content item including an object of an object ID that belongs to the selected cluster is included in the folder selected in Step S1201, by referring to the content metadata file (Step S1203). In the case where the corresponding content item is not included (Step S1203: No), the selection unit 103 proceeds to Step S1205. In the case where the corresponding content item is included (Step S1203: Yes), the selection unit 103 selects a content ID of the corresponding content item (Step S1204), and proceeds to Step S1205.

The selection unit 103 checks whether or not the number of selected content IDs is greater than or equal to a predetermined number (Step S1205). The predetermined number is 3 in Embodiment 2, though the predetermined number is not limited to this example.

In the case where the number of selected content IDs is greater than or equal to 3 (Step S1205: Yes), the selection unit 103 proceeds to Step S1207. In the case where the number of selected content IDs is less than 3 (Step S1205: No), the selection unit 103 selects a cluster of an importance level equal to the importance level of the currently selected cluster or a next lowest importance level (Step S1206), and returns to Step S1203. In the case where there is no corresponding cluster in Step S1206, the selection unit 103 proceeds to Step S1207.

Lastly, the selection unit 103 outputs all selected content IDs to the creation unit 104 (Step S1207).

The operations shown in FIGS. 11 and 12 are described in more detail below. In the following specific example, it is assumed that the content items are stored in the storage unit 101 as shown in FIGS. 3 and 7, and the cluster information is stored as shown in FIG. 10. It is also assumed that the last executed folder-based slideshow creation process is a folder-based slideshow creation process executed at 21:00 on Nov. 12, 2011 using the content items (capture date and time: Nov. 12, 2011) included in the folder of the folder ID FLD00012.

In such circumstances, it is further assumed that the content selection apparatus 100a is powered on at 10:00 on Nov. 23, 2011 by a user operation and, without loading any content item, enters the standby state at 10:30 on Nov. 23, 2011 by a user operation. Here, there is no other process of higher priority in the content selection apparatus 100a.

Having entered the standby state, the content selection apparatus 100a starts the determination process by the determination unit 102. First, the determination unit 102 determines whether or not work content creation is allowed (Step S401 in FIG. 11). There is no process of higher priority in this specific example, so that the determination unit 102 determines that work content creation is allowed (Step S401 in FIG. 11: Yes).

The determination unit 102 then obtains the creation date and time Tf of the last created folder-based slideshow (Step S1101 in FIG. 11). In this specific example, the creation date and time Tf is 21:00 on Nov. 12, 2011, as mentioned above. Moreover, the current date and time at which the content selection apparatus 100a enters the standby state is 10:30 on Nov. 23, 2011, which is at least the predetermined time (100 hours) after the creation date and time Tf (Step S1102 in FIG. 11). The determination unit 102 accordingly instructs the selection unit 103 to select each content item for creating the person look back content item (Step S1103 in FIG. 11).

The selection unit 103 selects each folder whose capture date and time is included in the predetermined period (Step S1201 in FIG. 12). In Embodiment 2, the predetermined period is 15 days in total that are made up of, as the reference date, the date 60 days ago from the date (Nov. 23, 2011 in this example) on which the person look back content item is created and 7 days before and after the reference date, i.e. from Sep. 17, 2011 to Oct. 1, 2011. The folders included in this period are the folders of the folder IDs FLD00001 and FLD00002, and the selection unit 103 selects these folders.

The selection unit 103 then selects the cluster of the lowest importance level (Step S1202 in FIG. 12). As shown in FIG. 10, the lowest importance level is 5, and the corresponding clusters are the clusters of the cluster IDs CLS0002, CLS0003, CLS0004, and CLS0007. The selection unit 103 selects the cluster of the smallest cluster ID CLS0002 from these clusters.

The object ID of the object that belongs to the cluster of the cluster ID CLS0002 is OBJ00002. The selection unit 103 checks whether or not a content item including the object of the object ID OBJ00002 is included in any of the selected folders of the folder IDs FLD00001 and FLD00002 (Step S1203 in FIG. 12).

As shown in FIG. 7, the folder of the folder ID FLD00001 includes the content items of the content IDs CNT00001 to CNT00003, of which the content item of the content ID CNT00003 includes the object of the object ID OBJ00002 (Step S1203 in FIG. 12: Yes). The selection unit 103 accordingly selects the content ID CNT00003 (Step S1204 in FIG. 12). Meanwhile, no content item including the object of the object ID OBJ00002 is included in the folder of the folder ID FLD00002 (Step S1203 in FIG. 12: No), and so the selection unit 103 does not select any content ID from the folder of the folder ID FLD00002.

The number of content IDs selected by the selection unit 103 so far is 1, which is less than the predetermined number of 3 (Step S1205 in FIG. 12: No). The selection unit 103 accordingly selects the cluster of the equal importance level or the next lowest importance level (Step S1206 in FIG. 12). The three clusters of the cluster IDs CLS0003, CLS0004, and CLS0007 remain as the clusters of the importance level 5 equal to that of the already selected cluster of the cluster ID CLS0002. For each of these three clusters, the selection unit 103 checks whether or not a content item including the object of the object ID that belongs to the cluster is included in any of the folders of the folder IDs FLD00001 and FLD00002, in the same way as the cluster of the cluster ID CLS0002 (Step S1203 in FIG. 12).

The object of the object ID OBJ00004 belongs to the cluster of the cluster ID CLS0003, and the content item of the content ID CNT00004 including the object is included in the folder of the folder ID FLD00002 (Step S1203 in FIG. 12: Yes). The selection unit 103 accordingly selects the content ID CNT00004 (Step S1204 in FIG. 12).

The object of the object ID OBJ00005 belongs to the cluster of the cluster ID CLS0004, and the content item of the content ID CNT00007 including the object is included in the folder of the folder ID FLD00002 (Step S1203 in FIG. 12: Yes). The selection unit 103 accordingly selects the content ID CNT00007 (Step S1204 in FIG. 12).

The object of the object ID OBJ00029 belongs to the cluster of the cluster ID CLS0007, but this object is not included in any of the content items in the folders of the folder IDs FLD00001 and FLD00002.

The number of content IDs selected by the selection unit 103 so far is 3, reaching the predetermined number of 3 (Step S1205 in FIG. 12: Yes). Hence, the selection unit 103 outputs all selected content IDs to the creation unit 104 (Step S1207 in FIG. 12).

Having received the content IDs, the creation unit 104 obtains the content items identified by the received content IDs, and creates a slideshow movie by combining the obtained content items with background data, music data, display effects, transition effects, and the like stored in the storage unit 101. The creation unit 104 records the content file of the created slideshow movie in the storage unit 101.

Thus, the content selection apparatus 100a according to Embodiment 2 detects objects shown in content items recorded in the storage unit 101, calculates an importance level of each detected object, and automatically creates a new work content item using content items in which objects low in importance level are shown. As a result, the user can enjoy an element of surprise from the content items, such as "I never thought I'd find him here", "Who is this person pictured large?", "Funny this pattern looks like a human face", or "Why is this in the picture?".

Though Embodiment 2 describes an example where a human face is used as the object, the object may be other than a human face. For example, the object may be an animal, a plant, a building, a tool, or the like. The object may also be not a human face but a human body. In this case, the feature value extraction unit 601 employs, as the object detection and feature value extraction method, a method capable of detecting each object and extracting such a feature value that enables each object to be identified.

In this way, the content selection apparatus 100a can select content items that offer the user an element of surprise such as "Why is this in the picture?", from a collection of content items showing animals, plants, buildings, tools, and the like. The content selection apparatus 100a can thus present a work content item created using such content items to the user.

The selection unit 103 in the content selection apparatus 100a according to Embodiment 2 may output the object IDs used for content selection to the creation unit 104 together with the selected content IDs.

Having received both the content IDs and the object IDs, the creation unit 104 can specify the object position of the object identified by each object ID, from the content metadata file. This enables the creation unit 104 to create the work content item using such display effects that zoom in the captured human face (or something that looks like a human face).

Moreover, the content selection apparatus 100a may select content items in which objects high in importance level are shown.

As mentioned earlier, the family or friends can be regarded as objects high in importance level. Besides, the user tends to look back content items on an event basis. In view of this, instead of fine content presentation to the user on an event basis, a look back content item may be created by, for example, extracting content items showing an object (or object cluster) designated by the user in the range of one month or one year so that the user can "look back in a digest form how a particular person was doing through various events".

In this way, the user can enjoy a work content item (e.g. the child's growth) that focuses on the designated specific object.

Moreover, the content selection apparatus 100a may, upon detecting that a new person look back content item is recorded in the storage unit 101, display an icon notifying the user of the creation of the person look back content item on a startup screen or a menu screen of the display unit 105. The content selection apparatus 100a may then reproduce the person look back content item via the display unit 105, when the user selects the icon displayed on the display unit 105 or selects the content item from a content list screen. In this way, the user can be notified of the creation of the person look back content item upon activating the content selection apparatus 100a next time.

Embodiment 3

A content selection apparatus according to Embodiment 3 detects objects shown in content items recorded in the storage unit, and automatically creates a new work content item using content items in which objects are detected and that are captured at an elevation angle greater than or equal to a first predetermined value or less than or equal to a second predetermined value.

Take, for example, a human face as an object. In many cases, the user takes a photograph or a movie by pointing the imaging device at a horizontal angle or a near horizontal angle. When capturing the sky or a building or when capturing an animal or the like walking on the ground, on the other hand, the user points the imaging device upward or downward.

In Embodiment 3, the angle of the vertical component in the imaging direction is defined as an elevation angle. The elevation angle is described in detail first.

Figure 13:
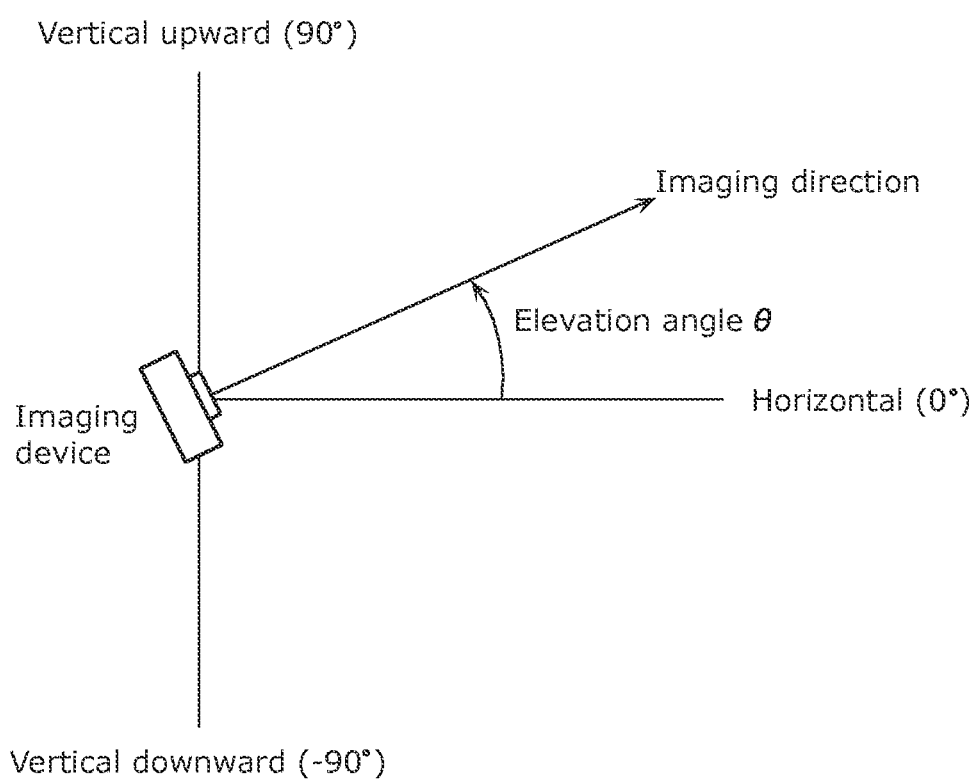
FIG. 13 is a diagram for describing an elevation angle according to Embodiment 3.

FIG. 13 is a diagram where the imaging device is seen edge-on at the same height as the imaging device.

In Embodiment 3, an angle θ between the imaging direction of the imaging device and the horizontal is defined as the elevation angle, where the horizontal direction is 0°, the vertical upward direction is 90°, and the vertical downward direction is −90° with respect to the imaging device, as shown in FIG. 13. The elevation angle is a positive value in the case where the imaging direction is above the horizontal (as in FIG. 13), and a negative value in the case where the imaging direction is below the horizontal.

When the elevation angle is a positive value greater than or equal to a certain value, the user is likely to capture the sky, a tall building or plant, or the like. When the elevation angle is less than or equal to a certain value, on the other hand, the user is likely to capture an animal walking on the ground, a plant on the ground, or the like.

A human face (or something that looks like a human face) is rarely shown in such content items. Even if a human face is actually shown, the user does not pay attention to or take notice of the human face when looking back these content items.

However, by compiling these content items into a new work content item and presenting it to the user, the user can enjoy an element of surprise from the content items, such as "I never thought I'd find someone here" or "Funny this part looks like a human face".

The content selection apparatus according to Embodiment 3 selects the above-mentioned content items having an element of surprise to the user, as content items that deliver unexpected value to the user. The content selection apparatus according to Embodiment 3 can thus present a work content item created using such content items to the user.

The functional structure of the content selection apparatus according to Embodiment 3 is the same as that shown in the block diagram in FIG. 6. The difference from the content selection apparatus 100a according to Embodiment 2 lies in that the importance level calculation unit 602 in the content selection apparatus according to Embodiment 3 (hereafter also referred to as "content selection apparatus 100b") does not perform any process. Therefore, the functional structure of the content selection apparatus 100b may be the structure shown in FIG. 6 from which the importance level calculation unit 602 is omitted.

The feature value extraction unit 601 is described first.

The feature value extraction unit 601 detects whether or not a human face is shown in a content item. This operation of the feature value extraction unit 601 is the same as that in Embodiment 2, and so its description is omitted.

The feature value extraction unit 601 in the content selection apparatus 100b also obtains information relating to the elevation angle of the imaging device when capturing the content item.

For instance, when recording the content item in the storage unit 101 via the loading unit 106, the content selection apparatus 100b reads capture date and time information and elevation angle information from associated information of the content item, and updates a content metadata file shown in FIG. 14. In addition to updating the content metadata file, the content selection apparatus 100b starts the extraction process by the feature value extraction unit 601 to detect whether or not a human face is shown in the loaded content item.

There are imaging devices provided with a sensor (e.g. accelerometer) for detecting the orientation of the imaging device itself, in order to display an electronic level on the screen of the imaging device to assist the user in image capture or in order to automatically switch the display between portrait and landscape orientations during reproduction. In the case of using such an imaging device to capture the content item, if the elevation angle information according to the sensor is recorded in the associated information (e.g. the maker note field of EXIF information in the case of photographs) of the content item, the feature value extraction unit 601 can obtain the elevation angle information. In the case of using an imaging device that is not provided with the sensor or an imaging device that is provided with the sensor but does not record the elevation angle information, the feature value extraction unit 601 cannot read the elevation angle information of the captured content item, and so does not write the elevation angle information to the content metadata file.

The other detailed operations of the feature value extraction unit 601 in the content selection apparatus 100b are the same as those in Embodiment 2, and so their description is omitted.

FIG. 14 is a diagram showing an example of a data structure of the content metadata file.

In the content metadata file shown in FIG. 14, the rows showing the content items of the content IDs CNT00058 to CNT00061 as an example and the column of an elevation angle 1401 are added to the structure shown in FIG. 7 in Embodiment 2. Though the object area 705 and the object feature value 706 are recorded in association with the content item in the example in FIG. 14 as in FIG. 7, the data in these fields are not shown in FIG. 14.

The operations of the determination unit 102 and the selection unit 103 according to Embodiment 3 are described below, with reference to FIGS. 15 and 16.

Having loaded new content items such as photographs or movies by the loading unit 106, the content selection apparatus 100b sorts the loaded content items into folders according to the capture date of each content item. The creation unit 104 in the content selection apparatus 100b then automatically creates a work content item "folder-based slideshow" for each folder, using the content items included in the folder. In the case where the folder-based slideshow creation is performed continuously every day, the creation unit 104 in the content selection apparatus 100b automatically creates a work content item "face look back slideshow" using content items that are captured at an elevation angle greater than or equal to the first predetermined value or less than or equal to the second predetermined value and in which human faces are shown. The work content item "face look back slideshow" is hereafter referred to as "face look back content item".

Figure 15:
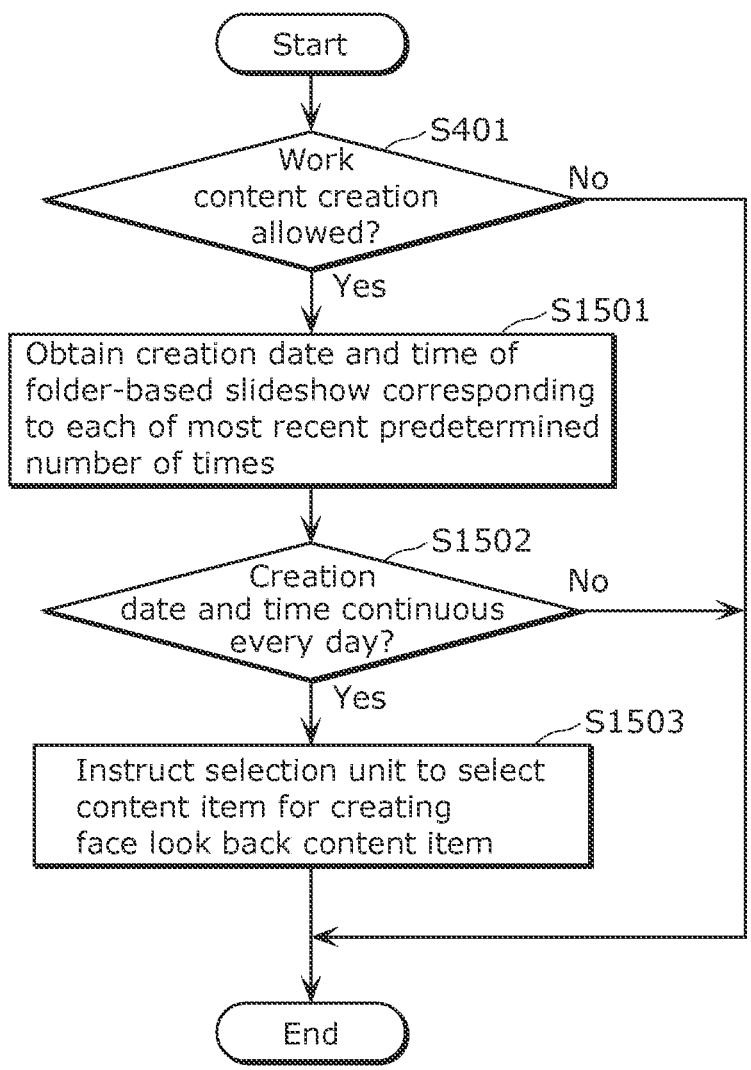
FIG. 15 is a flowchart showing an example of an operation of a determination unit according to Embodiment 3.

FIG. 15 is a flowchart showing an example of the operation of the determination unit 102.

The determination process by the determination unit 102 shown in FIG. 15 is started at a predetermined timing. In Embodiment 3, the predetermined timing is immediately after the power button of the content selection apparatus 100b is pressed and the content selection apparatus 100b enters the standby state. However, the determination process by the determination unit 102 may be started when the current time reaches a predetermined time, regardless of whether or not the content selection apparatus 100b is in the standby state.

First, the determination unit 102 determines whether or not the content selection apparatus 100b is in a state where work content creation is allowed (Step S401). This process has been described in Embodiment 1, and so its description is omitted. In the case where the determination unit 102 determines that work content creation is not allowed (Step S401: No), the determination unit 102 ends the determination process without performing the subsequent process. In the case where the determination unit 102 determines that work content creation is allowed (Step S401: Yes), the determination unit 102 obtains the creation date and time of the folder-based slideshow corresponding to each of a most recent predetermined number of times of folder-based slideshow creation (Step S1501). In Embodiment 3, the predetermined number is 3. Since the creation date and time is recorded together when recording the file of the created folder-based slideshow in the storage unit 101, the determination unit 102 can obtain the creation date and time.

The determination unit 102 then determines whether or not the creation date and time of the folder-based slideshow for the predetermined number of times is continuous every day (Step S1502). In the case where the creation date and time of the folder-based slideshow is continuous every day (Step S1502: Yes), the determination unit 102 proceeds to Step S1503. In the case where the creation date and time of the folder-based slideshow is not continuous every day (Step S1502: No), the determination unit 102 ends the determination process without performing the subsequent process.

Lastly, the determination unit 102 instructs the selection unit 103 to select each content item for creating the face look back content item (Step S1503), and ends the determination process.

Figure 16:
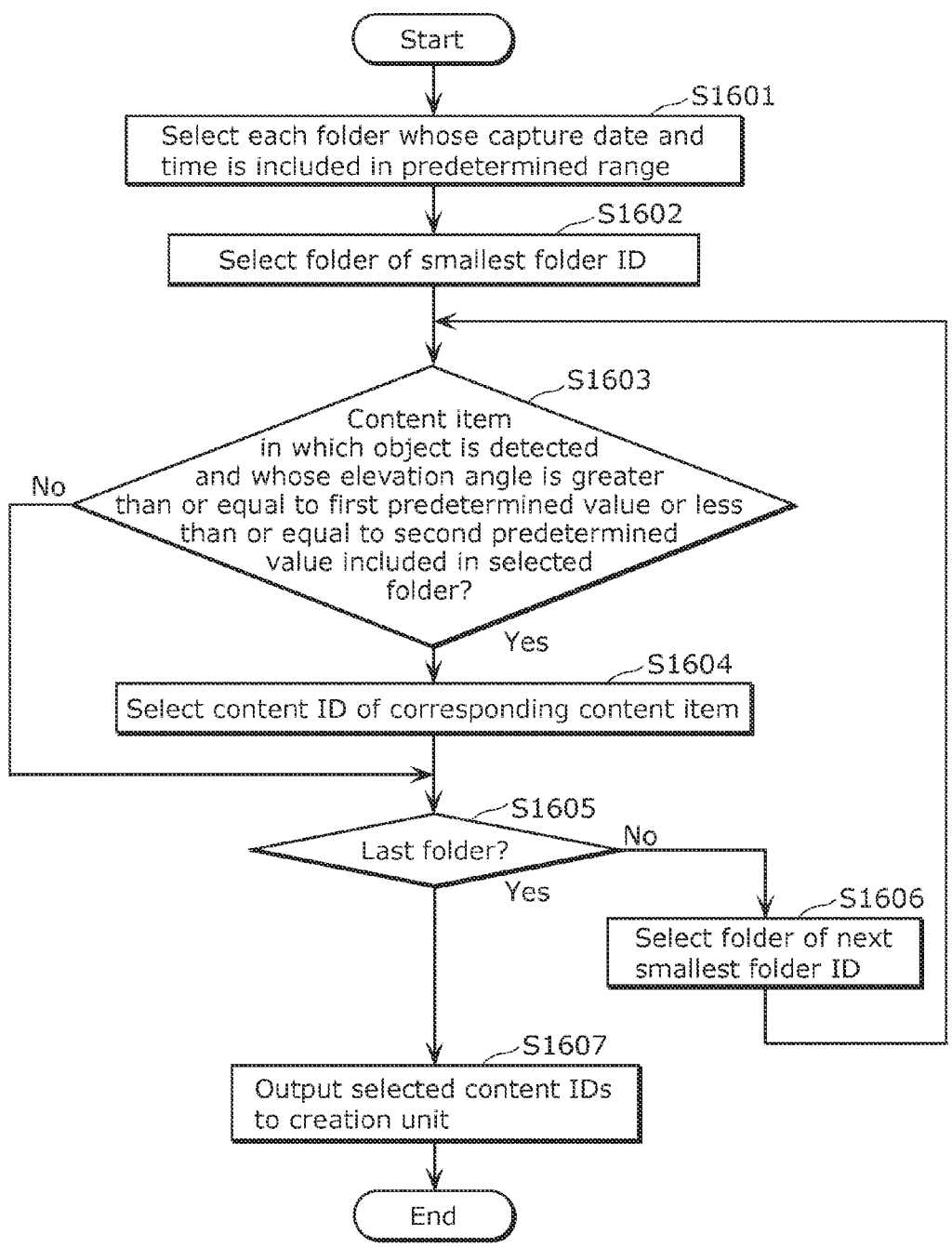
FIG. 16 is a flowchart showing an example of an operation of a selection unit according to Embodiment 3.

FIG. 16 is a flowchart showing an example of the operation of the selection unit 103.

Having received the instruction to select each content item for creating the face look back content item from the determination unit 102 in Step S1503 in FIG. 15, the selection unit 103 selects each folder whose content capture date and time is included in a predetermined range, by referring to the folder metadata file 204 (Step S1601). In Embodiment 3, the predetermined range is 5 days in total that are made up of, as a reference date, the date 30 days ago from the date on which the selection process by the selection unit 103 is performed and 2 days before and after the reference date. The predetermined range is, however, not limited to this. In the case where there is no folder whose content capture date and time is included in the predetermine range, the selection unit 103 ends the selection process.

The selection unit 103 then selects a folder of a smallest folder ID from the selected folders (Step S1602). The selection unit 103 checks whether or not a content item in which an object is detected and whose elevation angle is greater than or equal to the first predetermined value or less than or equal to the second predetermined value is included in the selected folder, by referring to the content metadata file (Step S1603). The first predetermined value is 45° and the second predetermined value is −45° in Embodiment 3, though the first predetermined value and the second predetermined value are not limited to this example.

In the case where the content item corresponding to the above-mentioned conditions is not included (Step S1603: No), the selection unit 103 proceeds to Step S1605. In the case where the content item corresponding to the above-mentioned conditions is included (Step S1603: Yes), the selection unit 103 selects a content ID of the corresponding content item (Step S1604), and proceeds to Step S1605.

The selection unit 103 checks whether or not the currently selected folder is the last one of the folders selected in Step S1601 (Step S1605). The last folder mentioned here is a folder on which Steps S1602 to S1604 are performed last of the folders selected in Step S1601. In the case where the currently selected folder is the last folder (Step S1605: Yes), the selection unit 103 proceeds to Step S1607. In the case where the currently selected folder is not the last folder (Step S1605: No), the selection unit 103 selects a folder of a next smallest folder ID (Step S1606), and returns to Step S1603.

Lastly, the selection unit 103 outputs all selected content IDs to the creation unit 104 (Step S1607).

The operations shown in FIGS. 15 and 16 are described in more detail below. In the following specific example, it is assumed that the content items are stored in the storage unit 101 as shown in FIGS. 3 and 14. It is also assumed that the folder-based slideshow is created every day from Nov. 10, 2011 to Nov. 12, 2011, based on the folders of the folder IDs FLD00010 to FLD00012. It is further assumed that the content selection apparatus 100b is powered on Nov. 13, 2011 and, without loading content items, enters the standby state on the same day by a user operation. Here, there is no other process of higher priority in the content selection apparatus 100b.

Having entered the standby state, the content selection apparatus 100b starts the determination process by the determination unit 102. First, the determination unit 102 determines whether or not work content creation is allowed (Step S401 in FIG. 15). There is no process of higher priority in this specific example, so that the determination unit 102 determines that work content creation is allowed (Step S401 in FIG. 15: Yes).

The determination unit 102 then obtains the creation date and time of the folder-based slideshow corresponding to each of the most recent predetermined number of times (three times) (Step S1501 in FIG. 15), and determines whether or not the folder-based slideshow is created every day (Step S1502 in FIG. 15). In this specific example, the folder-based slideshow is created every day from Nov. 10, 2011 to Nov. 12, 2011, as mentioned above. The determination unit 102 accordingly instructs the selection unit 103 to select each content item for creating the face look back content item (Step S1503 in FIG. 15).

The selection unit 103 selects each folder whose capture date and time is included in the predetermined period (Step S1601 in FIG. 16). In Embodiment 3, the predetermined period is 5 days in total that are made up of, as the reference date, the date 30 days ago from the date (Nov. 13, 2011 in this example) on which the face look back content item is created and 2 days before and after the reference date, i.e. from Oct. 12, 2011 to Oct. 16, 2011. The folders included in this period are the folders of the folder IDs FLD00004, FLD00005, and FLD00006, and the selection unit 103 selects these folders.

The selection unit 103 then selects the folder of the smallest folder ID FLD00004 (Step S1602 in FIG. 16), and checks whether or not a content item in which an object is detected and whose elevation angle is greater than or equal to the first predetermined value (45°) or less than or equal to the second predetermined value (−45°) is included in the folder (Step S1603 in FIG. 16).

One content item is included in the folder of the folder ID FLD00004, but this content item is a content item in which an object is not detected. Therefore, the selection unit 103 does not select any content item from the folder of the folder ID FLD00004 (Step S1603 in FIG. 16: No), and selects the next folder (Step S1605 in FIG. 16: No).

The selection unit 103 selects, as the next folder, the folder of the next smallest folder ID FLD00005 to the folder ID FLD00004 (Step S1606 in FIG. 16), and performs the same process. Two content items are included in the folder of the folder ID FLD00005. One (the content item of the content ID CNT00059) of these content items is a content item in which an object is detected and whose elevation angle in image capture is greater than or equal to the first predetermined value (Step S1603 in FIG. 16: Yes). The selection unit 103 accordingly selects the content ID CNT00059 of this content item (Step S1604 in FIG. 16).

The selection unit 103 further selects the folder of the next smallest folder ID FLD00006 to the folder ID FLD00005 (Step S1605: No, Step S1606 in FIG. 16), and performs the same process. Only the content item of the content ID CNT00061 is included in this folder, and the elevation angle of the content item in image capture is less than or equal to the second predetermined value (Step S1603 in FIG. 16: Yes). The selection unit 103 accordingly selects the content ID CNT00061 of this content item (Step S1604 in FIG. 16). Since the folder of the folder ID FLD00006 is the last folder whose capture date and time is included in the predetermined period (Step S1605 in FIG. 16: Yes), the selection unit 103 outputs all selected content IDs to the creation unit 104 (Step S1607 in FIG. 16).

Having received the content IDs, the creation unit 104 obtains the content items identified by the received content IDs, and creates a slideshow movie by combining the obtained content items with background data, music data, display effects, transition effects, and the like stored in the storage unit 101. The creation unit 104 records the content file of the created slideshow movie in the storage unit 101.

Thus, the content selection apparatus 100b according to Embodiment 3 detects objects shown in content items recorded in the storage unit 101, and automatically creates a new work content item using content items in which objects are detected and that are captured at an elevation angle greater than or equal to the first predetermined value or less than or equal to the second predetermined value.

As a result, the user can enjoy an element of surprise from the content items, such as "I never thought I'd find a human face here".

Though Embodiment 3 describes an example where a human face is used as the object, the object may be other than a human face. For example, the object may be an animal, a plant, a building, a tool, or the like. The object may also be not a human face but a human body. In this case, the feature value extraction unit 601 employs, as the object detection and feature value extraction method, a method capable of detecting each object and extracting such a feature value that enables each object to be identified.

In this way, the content selection apparatus 100b can select content items that offer the user an element of surprise such as "Why is this in the picture?", from a collection of content items showing animals, plants, buildings, tools, and the like. The content selection apparatus 100b can thus present a work content item created using such content items to the user.

The selection unit 103 in the content selection apparatus 100b according to Embodiment 3 may output the object IDs used for content selection to the creation unit 104 together with the selected content IDs.

Having received both the content IDs and the object IDs, the creation unit 104 can specify the object position of the object identified by each object ID, from the content metadata file. This enables the creation unit 104 to create the work content item using such display effects that gradually zoom in the captured human face (or something that looks like a human face).

Moreover, the content selection apparatus 100b may, upon detecting that a new face look back content item is recorded in the storage unit 101, display an icon notifying the user of the creation of the face look back content item on a startup screen or a menu screen of the display unit 105. The content selection apparatus 100b may then reproduce the face look back content item via the display unit 105, when the user selects the icon displayed on the display unit 105 or selects the content item from a content list screen. In this way, the user can be notified of the creation of the face look back content item upon activating the content selection apparatus 100b next time.

Embodiment 4

A content selection apparatus according to Embodiment 4 detects text as objects shown in content items recorded in the storage unit, and automatically creates a new work content item using content items in which text is shown.

When the user captures a content item, the user may intentionally include text in the content item. For example, text (e.g. a sign that reads "Sports day" in a sports day, a station name sign in transportation during a travel) describing an event such as a travel or a school event or any situation during the event is often intentionally captured because it provides important information for the event upon a subsequent look back. The user may also capture text (e.g. a sign) which he or she happens to find interesting, even though it does not particularly relate to any event. There are also instances where text is shown in the captured content item without the user's intension.

Text relating to an event or text attracting the user's interest can describe the event or situation by itself, and so is effective when the user recalls the event or situation upon looking back each content item. The content selection apparatus according to Embodiment 4 compiles, into a new work content item, content items showing text that includes not only the above-mentioned text but also text captured without the user's intension, and presents it to the user. The user can thus enjoy his or her behavior or situation or an element of surprise from the content items, such as "Looking back, I have been to many places recently" or "I didn't know this place has a funny sign".

The content selection apparatus according to Embodiment 4 selects the above-mentioned content items having an element of surprise to the user, as content items that deliver unexpected value to the user. The content selection apparatus according to Embodiment 4 can thus present a work content item created using such content items to the user.

Figure 17:
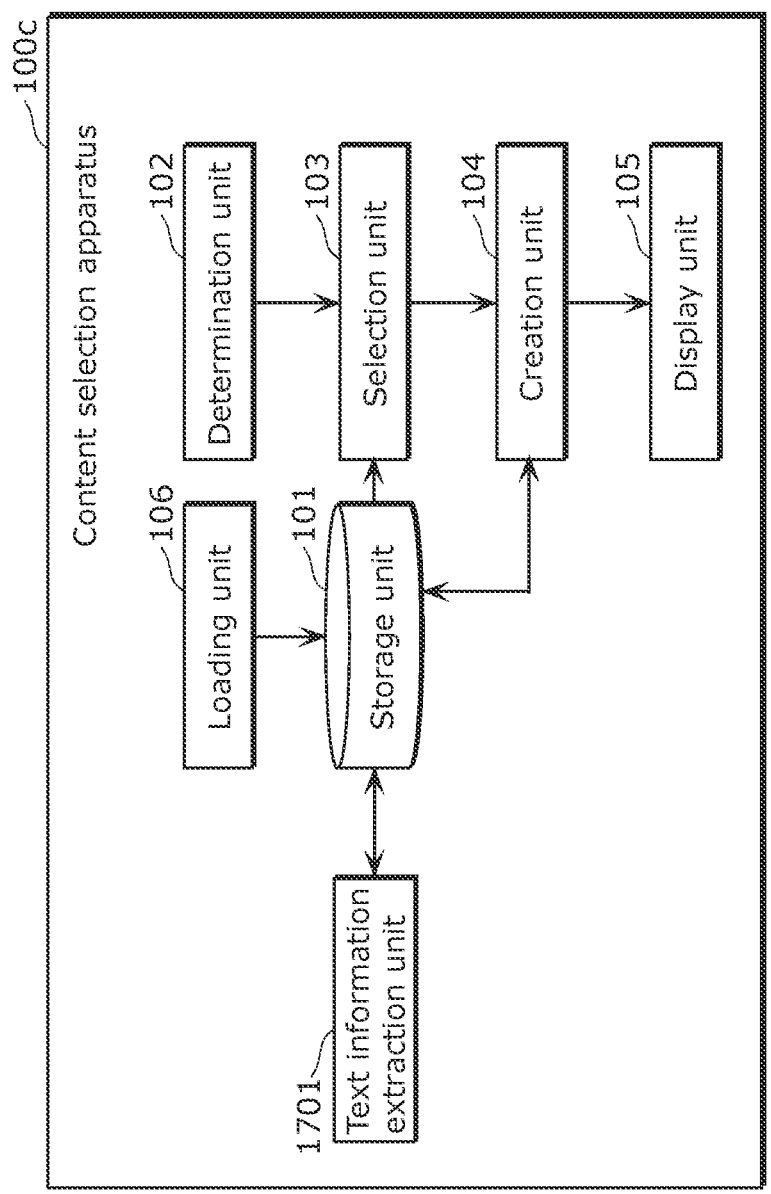
FIG. 17 is a block diagram showing a functional structure of a content selection apparatus according to Embodiment 4.

FIG. 17 is a block diagram showing a functional structure of the content selection apparatus according to Embodiment 4. The difference from the content selection apparatus 100 according to Embodiment 1 lies in that a content selection apparatus 100c according to Embodiment 4 further includes a text information extraction unit 1701.

The text information extraction unit 1701 is described first.

The text information extraction unit 1701 extracts text information which is information relating to text shown in a content item.

When recording the content item in the storage unit 101 via the loading unit 106, the content selection apparatus 100c reads capture date and time information from associated information (e.g. EXIF information in the case of photographs) associated with the content item, and updates a content metadata file as shown in FIG. 49. In addition to updating the content metadata file, the content selection apparatus 100c starts the extraction process by the text information extraction unit 1701 to detect text shown in the loaded content item.

The text information extraction unit 1701 selects one loaded content item at a time, and performs a text recognition process to detect text shown in the selected content item. For instance, a technique called OCR (Optical Character Recognition) can be used for the text recognition process. In the case where text is detected from the content item as a result of the text recognition process, the text information extraction unit 1701 records the text recognition result and area information of the part recognized as text, in the content metadata file in association with the content item. The text information extraction unit 1701 also adds the content ID of the content item determined as showing text, to text information detection content information shown in FIG. 18.

FIG. 18 is a diagram showing an example of a data structure of the text information detection content information.

In the text information detection content information, the content ID of each content item determined as showing text is registered by the text information extraction unit 1701. In the example in FIG. 18, even in the case where one content item has a plurality of areas each showing text, one content ID corresponding to the content item is stored in the text information detection content information.

FIG. 19 is a diagram showing an example of a data structure of the content metadata file according to Embodiment 4.

The content metadata file includes, for each content item, a content ID 701, a filename 702, a folder ID 301, a capture date and time 703, a text information ID 1901, a text information area 1902, and a text recognition result 1903 in association with each other.

The text information ID 1901 is an ID for identifying text recognized in the content item. The text information ID 1901 is a character string in which "CHR" is followed by a serial number assigned in the order in which the text is recognized.

The text information area 1902 indicates the position and area size of the recognized text in the content item (image). The text recognition result 1903 indicates the text recognized as a result of the above-mentioned text recognition process.

In the content metadata file, the text information ID 1901, the text information area 1902, and the text recognition result 1903 are not recorded in the case where the text information extraction unit 1701 does not recognize any text shown in the content item. In the example in FIG. 19, the content items whose content IDs 701 are CNT00102 and CNT00104 are content items not recognized as showing text. In the case where a plurality of text units (e.g. the characters "Sports day" are set as one text unit) are determined to be shown in one content item, on the other hand, text information IDs 1901, text information areas 1902, and text recognition results 1903 corresponding in number to the detected text units are recorded in association with one content ID.

Figure 20:
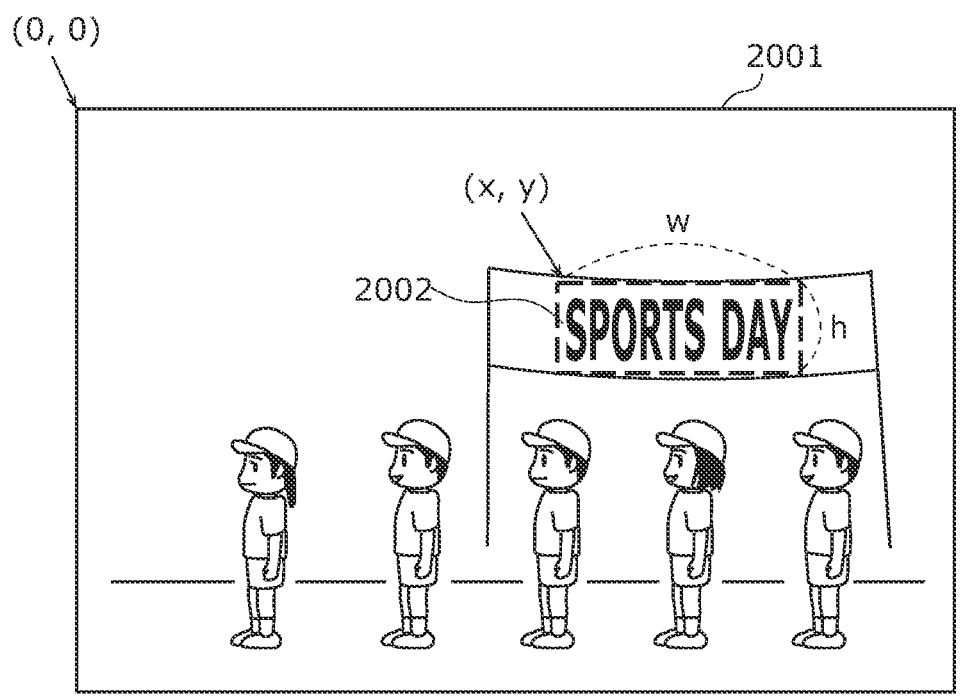
FIG. 20 is a diagram showing an example of a text information area.

FIG. 20 is a diagram showing an example of a content item in which text information is shown.

When text in a content item 2001 is recognized by the text information extraction unit 1701, a text recognition result "Sports day" and a text information area indicated by a frame 2002 are obtained. The text information extraction unit 1701 records, as the text information area, the values (x, y, w, h) where the top left of the content item 2001 is the origin (0, 0) of an x-y coordinate system, the coordinates of the top left of the frame 2002 are (x, y) in the coordinate system, and the width and height of the frame 2002 are (w, h), in the content metadata file together with the text recognition result.

The operations of the determination unit 102 and the selection unit 103 according to Embodiment 4 are described below, with reference to FIGS. 21 and 22.

Once the number of content items in which text is shown has reached a predetermined value or more, the content selection apparatus 100c automatically creates a work content item "text information look back slideshow" using the content items in which text is shown. The work content item "text information look back slideshow" is hereafter referred to as "text information look back content item".

Figure 21:
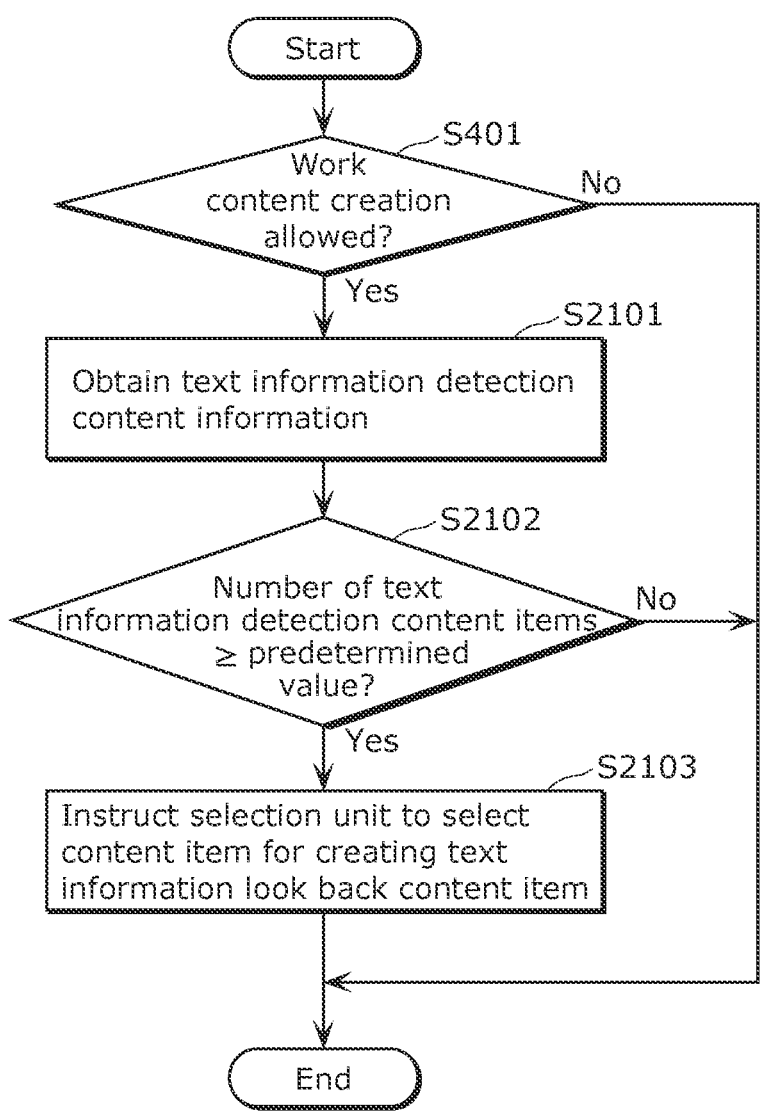
FIG. 21 is a flowchart showing an example of an operation of a determination unit according to Embodiment 4.

FIG. 21 is a flowchart showing an example of the operation of the determination unit 102.

The determination process by the determination unit 102 shown in FIG. 21 is started at a predetermined timing. In Embodiment 4, the predetermined timing is immediately after the power button of the content selection apparatus 100c is pressed and the content selection apparatus 100c enters the standby state. However, the determination process by the determination unit 102 may be started when the current time reaches a predetermined time, regardless of whether or not the content selection apparatus 100c is in the standby state.

First, the determination unit 102 determines whether or not the content selection apparatus 100c is in a state where work content creation is allowed (Step S401). This process has been described in Embodiment 1, and so its description is omitted. In the case where the determination unit 102 determines that work content creation is not allowed (Step S401: No), the determination unit 102 ends the determination process without performing the subsequent process. In the case where the determination unit 102 determines that work content creation is allowed (Step S401: Yes), the determination unit 102 obtains the text information detection content information (Step S2101).

The determination unit 102 then determines whether or not the number of content IDs registered in the text information detection content information is greater than or equal to a predetermined value (Step S2102). The predetermined value is 5 in Embodiment 4, though the predetermined value is not limited to this. In the case where the number of content IDs registered in the text information detection content information has not reached the predetermined value (Step S2102: No), the determination unit 102 ends the determination process without performing the subsequent process.

In the case where the number of content IDs registered in the text information detection content information is greater than or equal to the predetermined value (Step S2102: Yes), the determination unit 102 instructs the selection unit 103 to select each content item for creating the text information look back content item (Step S2103), and ends the determination process.

Figure 22:
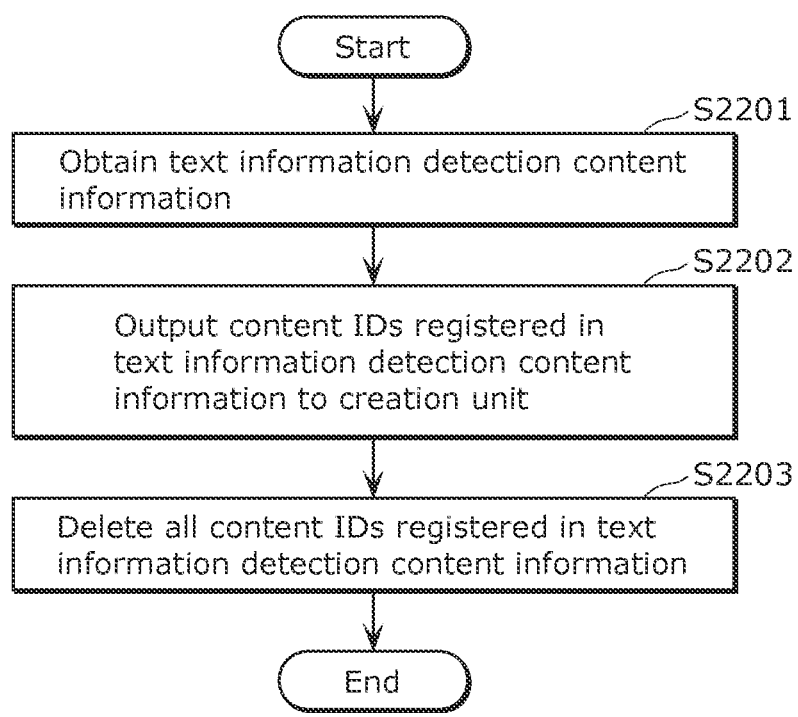
FIG. 22 is a flowchart showing an example of an operation of a selection unit according to Embodiment 4.

FIG. 22 is a flowchart showing an example of the operation of the selection unit 103.

Having received the instruction to select each content item for creating the text information look back content item from the determination unit 102 in Step S2103 in FIG. 21, the selection unit 103 obtains the text information detection content information (Step S2201).

The selection unit 103 outputs all content IDs registered in the text information detection content information, to the creation unit 104 (Step S2202).

Lastly, the selection unit 103 deletes all content IDs registered in the text information detection content information (Step S2203), and ends the selection process.

The operations shown in FIGS. 21 and 22 are described in more detail below. In the following specific example, it is assumed that the content items are stored in the storage unit 101 as shown in FIG. 19. It is also assumed that the text information look back content item has already been created before the content item of the content ID CNT00101 is stored, and the text information detection content information is reset (all registered content IDs are deleted). It is further assumed that the content items of the content IDs CNT00101 to CNT00107 are then registered in the text information detection content information and, after the content item of the content ID CNT00107 is stored, the content selection apparatus 100c enters the standby state by a user operation. Here, there is no other process of higher priority in the content selection apparatus 100c.

Having entered the standby state, the content selection apparatus 100c starts the determination process by the determination unit 102. First, the determination unit 102 determines whether or not work content creation is allowed (Step S401 in FIG. 21). There is no process of higher priority in this specific example, so that the determination unit 102 determines that work content creation is allowed (Step S401 in FIG. 21: Yes).

The determination unit 102 then obtains the text information detection content information (Step S2101 in FIG. 21), and determines whether or not the number of registered content IDs is greater than or equal to the predetermined value (5) (Step S2102 in FIG. 21). As shown in FIG. 19, the content items in which text information is detected are the five content items of the content IDs CNT00101, CNT00103, CNT00105, CNT00106, and CNT00107, all of which are registered in the text information detection content information. Therefore, the determination unit 102 determines that the number of content IDs registered in the text information detection content information is greater than or equal to the predetermined value (Step S2102 in FIG. 21: Yes). The determination unit 102 accordingly instructs the selection unit 103 to select each content item for creating the text information look back content item (Step S2103 in FIG. 21).

The selection unit 103 obtains the text information detection content information (Step S2201 in FIG. 22), and outputs all registered content IDs to the creation unit 104 (Step S2202 in FIG. 22). The selection unit 103 then deletes all content IDs registered in the text information detection content information (Step S2203 in FIG. 22).

Having received the content IDs, the creation unit 104 obtains the content items identified by the received content IDs, and creates a slideshow movie by combining the obtained content items with background data, music data, display effects, transition effects, and the like stored in the storage unit 101. The creation unit 104 records the content file of the created slideshow movie in the storage unit 101.

Thus, the content selection apparatus 100c according to Embodiment 4 detects text as objects shown in content items recorded in the storage unit 101, and automatically creates a new work content item using the content items in which text is shown.

Though Embodiment 4 describes an example where the text information look back content item is created using all content items in which text is shown, the content selection apparatus 100c may select content items based on the text information area registered in the content metadata file. For example, the content selection apparatus 100c may create the text look back content item using only content items in which text of a size smaller than a predetermined value is shown.

The text look back content item created for small-size text in this way enables the user to collectively view text which the user does not pay attention to or take notice of when viewing content items in order to look back events. The user can thus enjoy an element of surprise from the content items, such as "I never thought I'd find such text here".

Conversely, the content selection apparatus 100c may create the text look back content item using only content items in which text of a size larger than a predetermined value is shown.

The text look back content item created for large-size text in this way is a content item that collects only relatively large text such as signs. Hence, the text look back content item created for large-size text enables the user to collectively look back the places he or she visited in events or travels or the places he or she passed on the way.

Moreover, to direct the user's attention to the text in the content item, the creation unit 104 may obtain the text information area based on the content ID and the content metadata file and create the work content item using such display effects that gradually zoom in the shown text.

Moreover, the content selection apparatus 100c may, upon detecting that a new text information look back content item is recorded in the storage unit 101, display an icon notifying the user of the creation of the text information look back content item on a startup screen or a menu screen of the display unit 105. The content selection apparatus 100c may then reproduce the text information look back content item via the display unit 105, when the user selects the icon displayed on the display unit 105 or selects the content item from a content list screen. In this way, the user can be notified of the creation of the text information look back content item upon activating the content selection apparatus 100c next time.

Embodiment 5

A content selection apparatus according to Embodiment 5 obtains information relating to a method of automatically creating a new work content item using content items recorded in the storage unit, from outside the content selection apparatus. The content selection apparatus according to Embodiment 5 thus automatically creates a work content item using a new method different from a fixed automatic creation method (in detail, automatic creation timing and a content selection method) set in the content selection apparatus beforehand.

Various work content creation methods have been described in the foregoing embodiments. Each of the work content creation methods described above enables unexpected value to be delivered to the user from the stored content items.

However, if the work content creation method remains fixed, even though the user finds the created work content item new at first, the user will eventually get used to the creation method. This can lead to a problem that, while the created work content item still offers an element of surprise, the perspective (selection method) when creating the work content item is no longer unpredictable to the user.

For example, if the content selection apparatus is capable of continuously obtaining a new work content creation method for the user, which is provided from a service provider or another user, and utilizing the obtained method, the user can keep enjoying an element of surprise of content items in various styles.

The content selection apparatus according to Embodiment 5 obtains information (hereafter referred to as "creation rule") relating to an automatic work content creation method, from outside the content selection apparatus. The content selection apparatus can thus automatically create a content item according to the new creation method, so that the user can keep enjoying an element of surprise of content items in various styles.

Figure 23:
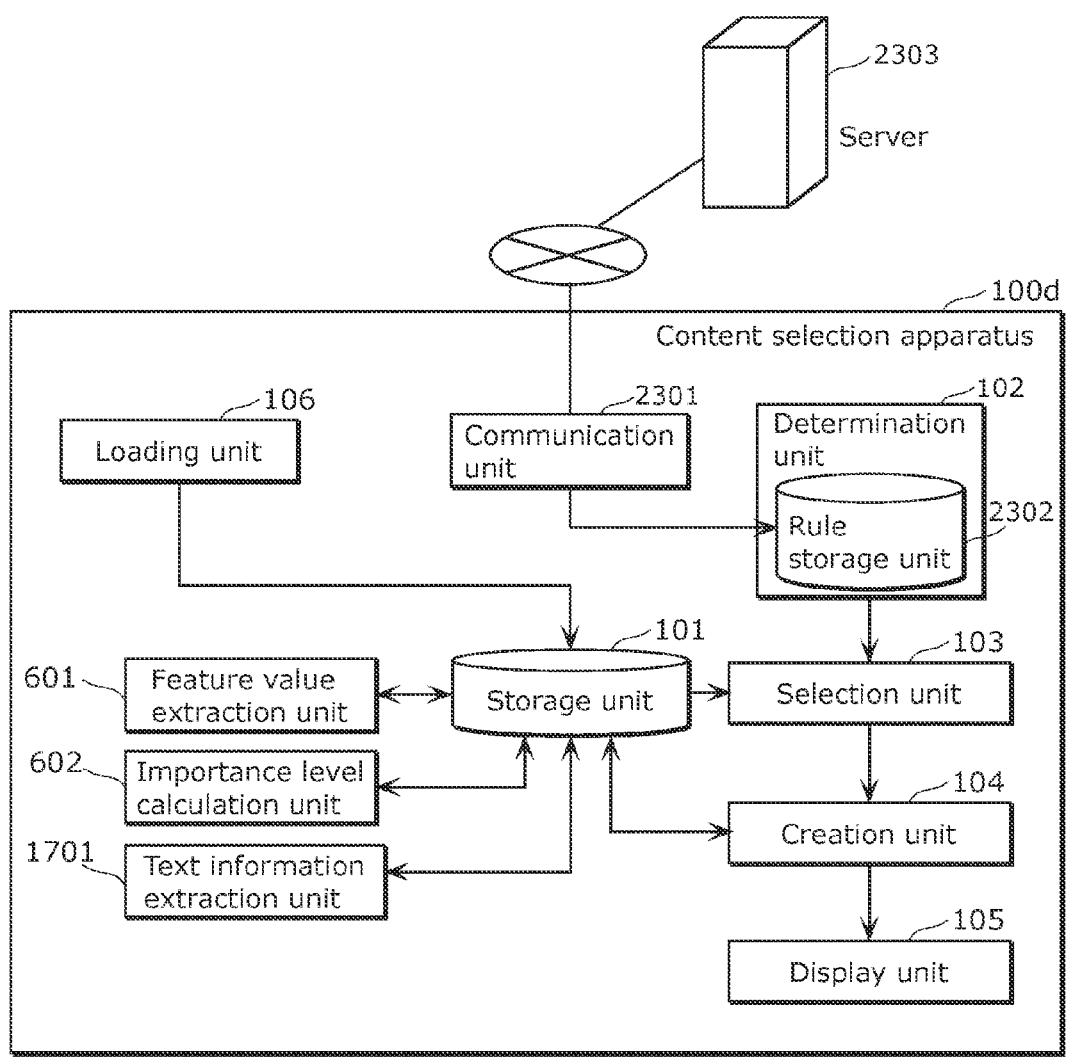
FIG. 23 is a block diagram showing a functional structure of a content selection apparatus according to Embodiment 5.

FIG. 23 is a block diagram showing a functional structure of the content selection apparatus according to Embodiment 5. A content selection apparatus 100d according to Embodiment 5 includes at least the same structure as that in one of the functional block diagrams described in Embodiments 1 to 4, and further includes a communication unit 2301 that obtains a creation rule from outside (e.g. a server 2303) and a rule storage unit 2302 that stores the obtained creation rule. The content selection apparatus 100d according to Embodiment 5 may include all of the functional blocks described in Embodiments 1 to 4 and further include the communication unit 2301 and the rule storage unit 2302.

The communication unit 2301 communicates with the server 2303 that stores one or more creation rules for work content creation.

The rule storage unit 2302 stores the creation rule obtained from the server 2303.

In Embodiment 5, the determination unit 102 determines whether or not work content creation is allowed as in Embodiments 1 to 4, and further obtains the creation rule from the server 2303. The creation rule is obtained via the communication unit 2301.

For example, the creation rule obtainment by the determination unit 102 is performed on a regular basis. In Embodiment 5, the determination unit 102 inquires of the server 2303 whether or not a new creation rule is registered, at a predetermined time (e.g. 2:00 a.m.) every day. In the case where a new creation rule is registered in the server 2303, the determination unit 102 obtains the new creation rule from the server 2303 via the communication unit 2301. The new creation rule mentioned here is a creation rule that has not been obtained in the content selection apparatus 100*d*.

The determination unit 102 refers to creation rule information stored in the rule storage unit 2302, and selects a creation rule used for work content creation. The creation rule may be a creation rule of an earliest registration date and time selected from unexecuted creation rules, a creation rule randomly selected from the unexecuted creation rules, or a creation rule randomly selected from all creation rules. Selection methods other than these are also available.

FIG. 24 is a diagram showing an example of a creation rule.

The creation rule shown in FIG. 24 includes a creation timing 2401, a content selection range 2402, a content selection method 2403 (selection mode) indicating a method of content selection, and a selection key 2404 indicating a selection key used upon content selection.

The creation timing 2401 indicates at which timing the content selection apparatus 100*d* starts work content creation indicated by the creation rule. In the example in FIG. 24, the creation timing 2401 is immediately after the creation rule is received by the content selection apparatus 100*d* or when content creation is first allowed.

The creation timing in the case where the content selection apparatus 100*d* is such a content selection apparatus that performs automatic work content creation immediately after entering the standby state is described as an example.

In the case where the content selection apparatus 100*d* obtains the creation rule in the standby state, the content selection apparatus 100*d* determines whether or not there is any other task of higher priority, in the case where there is no other task of higher priority, the content selection apparatus 100*d* performs work content creation immediately after the obtainment of the creation rule.

In the case where the content selection apparatus 100*d* obtains the creation rule not in the standby state but in a state of being used by the user, on the other hand, the content selection apparatus 100*d* performs work content creation when the content selection apparatus 100*d* enters the standby state next time.

The content selection range 2402 indicates a temporal range of content items to be selected by the selection unit 103 from the content items stored in the storage unit 101 upon work content creation. In the case where the content selection range 2402 is not designated, all content items stored in the storage unit 101 are subject to selection.

In the example in FIG. 24, the content selection range 2402 is a period of most recent two months before the creation rule is obtained by the content selection apparatus 100*d*. Content items captured during this period are subject to selection by the selection unit 103.

The content selection method 2403 indicates a method of content selection. The selection key 2404 indicates a selection key used in the selection method indicated by the content selection method 2403.

The content selection method 2403 in the example in FIG. 24 indicates a method of comparing an object feature value in each content item included in the content selection range 2402 and an object feature value indicated by the selection key 2404 and selecting each content item including an object feature value whose distance from the object feature value indicated by the selection key 2404 is less than or equal to a designated value (denoted by N). The object feature value mentioned here is a vector of a plurality of dimensions as described in Embodiment 2, and the distance between the object feature values is a Euclidean distance between vectors. Alternatively, the distance may be calculated by other similar methods.

The creation rule obtained by the content selection apparatus 100*d* is recorded in the creation rule information in the rule storage unit 2302.

FIG. 25 is a diagram showing an example of the creation rule information recorded in the rule storage unit 2302.

The creation rule information includes an execution flag 2501 indicating, for each creation rule, whether or not the creation rule is executed and a registration date and time 2502 which is a date and time at which the creation rule is registered in the creation rule information, in addition to the creation rule as shown in FIG. 24. In the example in FIG. 25, an already executed creation rule is recorded as "executed" and an unexecuted creation rule is recorded as "unexecuted" in the field of the execution flag 2501.

The process by the determination unit 102 according to Embodiment 5 is described below, with reference to FIG. 26.

Figure 26:
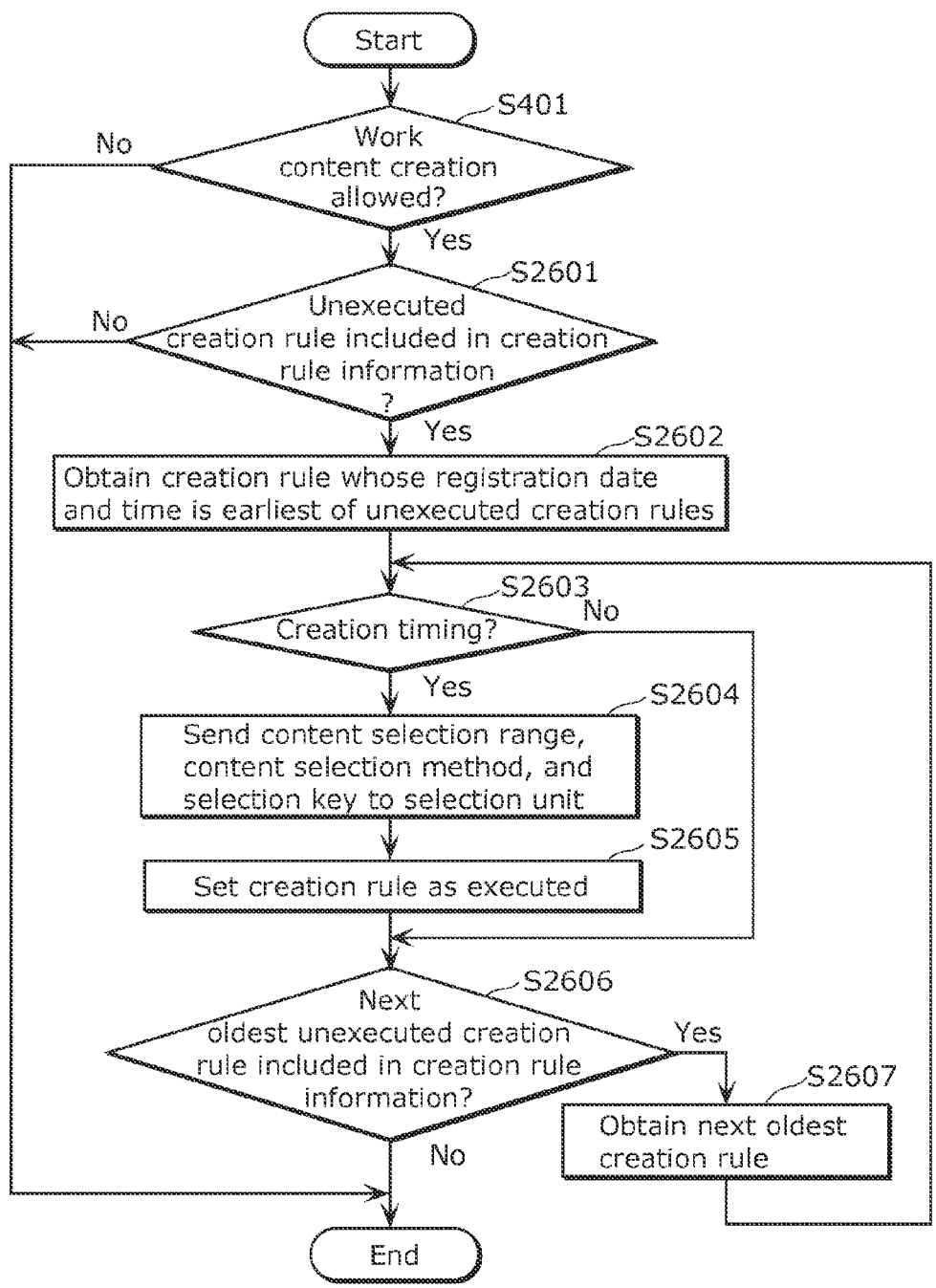
FIG. 26 is a flowchart showing an example of an operation of a determination unit according to Embodiment 5.

FIG. 26 is a flowchart showing an example of the operation of the determination unit 102. In the flowchart in FIG. 26, the creation rule selection method of selecting an unexecuted creation rule of an earliest registration date and time is shown as an example.

The determination process by the determination unit 102 is started at a predetermined timing. In Embodiment 5, the predetermined timing is immediately after the power button of the content selection apparatus 100*d* is pressed and the content selection apparatus 100*d* enters the standby state. However, the determination process by the determination unit 102 may be started when the current time reaches a predetermined time, regardless of whether or not the content selection apparatus 100*d* is in the standby state.

First, the determination unit 102 determines whether or not the content selection apparatus 100*d* is in a state where work content creation is allowed (Step S401). This process has been described in Embodiment 1, and so its description is omitted. In the case where the determination unit 102 determines that work content creation is not allowed (Step S401: No), the determination unit 102 ends the determination process without performing the subsequent process.

In the case where the determination unit 102 determines that work content creation is allowed (Step S401: Yes), the determination unit 102 determines whether or not any unexecuted creation rule is included in the creation rule information recorded in the rule storage unit 2302 (Step S2601). In the case where no unexecuted creation rule is included in the creation rule information recorded in the rule storage unit 2302 (Step S2601: No), the determination unit 102 ends the determination process regardless of whether or not work content creation is allowed. In the case where there is no unexecuted creation rule in Step S2601, the determination unit 102 may select and execute a creation rule. In detail, for example, the determination unit 102 may randomly select one of the executed creation rules.

In the case where any unexecuted creation rule is included in the creation rule information recorded in the rule storage unit 2302 (Step S2601: Yes), the determination unit 102 obtains a creation rule whose registration date and time is earliest of the unexecuted creation rules (Step S2602).

The determination unit 102 refers to the creation timing 2401 of the obtained creation rule, and determines whether or not the current time is within the creation timing (Step S2603). In the case where the current time is not within the creation timing (Step S2603: No), the determination unit 102 proceeds to Step S2606. In the case where the current time is within the creation timing (Step S2603: Yes), the determination unit 102 sends the content selection range 2402, the content selection method 2403, and the selection key 2404 of the creation rule, to the selection unit 103 (Step S2604). The determination unit 102 then changes the execution flag 2501 corresponding to the creation rule obtained in Step S2602 to executed (Step S2605), and proceeds to Step S2606.

In Step S2606, the determination unit 102 checks whether or not a next oldest unexecuted creation rule is included in the creation rule information (Step S2606), in the case where the next oldest unexecuted creation rule is not included in the creation rule information (Step S2606: No), the determination unit 102 ends the determination process. In the case where the unexecuted creation rule is included in the creation rule information (Step S2606: Yes), the determination unit 102 obtains the creation rule (Step S2607), and returns to Step S2603.

The operation shown in FIG. 26 is described in more detail below. In the following specific example, it is assumed that the content selection apparatus 100d obtains a new creation rule from the server and the obtained creation rule is registered as the creation rule information as shown in FIG. 25, on Oct. 5, 2011. It is also assumed that the content selection apparatus 100d is powered on the day following the obtainment of the new creation rule and, after operated for a while, enters the standby state by a user operation. Here, there is no other process of higher priority in the content selection apparatus 100d.

Having entered the standby state, the content selection apparatus 100d starts the determination process by the determination unit 102. First, the determination unit 102 determines whether or not work content creation is allowed (Step S401 in FIG. 26). There is no process of higher priority in this specific example, so that the determination unit 102 determines that work content creation is allowed (Step S401 in FIG. 26: Yes).

The determination unit 102 then checks whether or not any unexecuted creation rule is included in the creation rule information (Step S2601 in FIG. 26). In this specific example, there is one unexecuted creation rule as shown in FIG. 25, and the determination unit 102 obtains the creation rule (Step S2602 in FIG. 26).

The determination unit 102 obtains the creation timing included in the obtained creation rule, and determines whether or not the current time is within the creation timing (Step S2603 in FIG. 26). In the example in FIG. 25, the creation timing 2401 in the unexecuted creation rule is "after reception of creation rule or upon first creation allowance", so that the determination unit 102 determines that the current time is within the creation timing (Step S2603 in FIG. 26: Yes).

Following this, the determination unit 102 outputs the content selection range 2402 "most recent two months", the content selection method "content item including object feature value whose distance from object feature value indicated by selection key is less than or equal to N", and the selection key "(124, 67, ... )" designated in the obtained unexecuted creation rule, to the selection unit 103 (Step S2604 in FIG. 26).

The determination unit 102 then sets the execution flag of the obtained creation rule as "executed" (Step S2605 in FIG. 26), and determines whether or not a next oldest unexecuted creation rule is included (Step S2606 in FIG. 26). Since there is no more unexecuted creation rule in the creation rule information (Step S2606 in FIG. 26: No), the determination unit 102 ends the determination process.

The processes by the selection unit 103 and the creation unit 104 are the same as those described in the foregoing embodiments, and so their description is omitted.

Thus, the content selection apparatus 100d according to Embodiment 5 obtains information relating to a method of automatically creating a new work content item using content items recorded in the storage unit 101, from outside the content selection apparatus.

As a result, the content selection apparatus 100d can automatically create a work content item according to the new creation method, so that the user can keep enjoying an element of surprise of content items in various styles.

Though the above describes the case where the content selection apparatus 100d obtains a creation rule from the server 2303 via the communication unit 2301, the content selection apparatus 100d may obtain a creation rule from a storage medium such as a memory card. Alternatively, the content selection apparatus 100d may obtain a creation rule from another content selection apparatus. In the case where the content selection apparatus 100d is capable of identifying the owner of another content selection apparatus, for example, the content selection apparatus 100d may obtain a creation rule from another content selection apparatus the owner of which is closely related to the user, through the use of information about the user's relationships such as the social graph.

Though the above describes the case where the rule storage unit 2302 is included in the determination unit 102, the function of the rule storage unit 2302 may be incorporated in the storage unit 101 so that the creation rule is recorded in the storage unit 101.

Though the above describes the case where the determination unit 102 in the content selection apparatus 100d inquires of the server 2303 whether or not a new creation rule is registered at a predetermined time every day, the server 2303 may transmit the new creation rule to the content selection apparatus 100d when the new creation rule is registered in the server 2303.

Moreover, the determination unit 102 in the content selection apparatus 100d may inquire of the server 2303 whether or not a new creation rule is registered, in the case where all creation rules stored in the rule storage unit 2302 have been used to create a work content item by the creation unit 104.

Though the temporal range is designated as the content selection range 2402 in the creation rule described in Embodiment 5, the content selection range 2402 may indicate a spatial range.

In this case, the content selection range 2402 is determined based on position information that is detected by position detection means (e.g. position estimation by a wireless communication base station, GPS, etc.) included in or connected to the imaging device and recorded in association with each content item. In detail, content items captured within the range of the distance from the starting point (e.g. point representing the location of a famous tourist spot) indicated in the content selection range 2402 are subject to selection.

Though the object feature value is used as the content selection method 2403 and the selection key 2404 in the creation rule described in Embodiment 5, text information or color information may be used as the content selection method 2403 and the selection key 2404.

In the case of using text information, for example in FIG. 24, the content selection method 2403 may be set as "content item including text information", with a specific character string being designated as the selection key 2404. In this way, the content selection apparatus 100*d* can select each content item that includes, as text information, the character string designated by the selection key 2404.

In the case of using color information, for example in FIG. 24, the content selection method 2403 may be set as "content item including color information", with specific color information (e.g. 24-bit RGB value) being designated as the selection key 2404. In this way, the content selection apparatus 100*d* can select each content item in which the ratio of pixels of a color indicated by the color information of the selection key 2404 or a similar color (e.g. in the case of a color indicated by a 24-bit RGB value of R=128, G=200, and B=45, a color in a range of ±10 in each color channel, i.e. a range of 118≤R≤138, 190≤G≤210, and 35≤B≤55) to all pixels is greater than or equal to a predetermined ratio (e.g. 30% of all pixels).

In the creation rule information described in Embodiment 5, whether or not the work content creation process is executed using the creation rule is managed using the execution flag. Alternatively, the creation rule use history may be managed using, for example, information such as the date and time at which the creation rule was used or the number of times the creation rule has been used previously. This enables finer creation rule use, such as using a creation rule which has not been used for a predetermined period upon creating a new work content item.

[Variations]

Though each of the above embodiments describes an example where still image content items (photographs) are used to create a new work content item, moving image content items (movies) may be used to create a new work content item.

The content selection apparatus according to each of the above embodiments may store the history of creation rules as described in Embodiment 5 and content items (or folders) used for work content creation, in the storage unit 101. The content selection apparatus may then create a work content item using an unused creation rule and content items rather than a creation rule and content items which have already been used.

Though each of the above embodiments describes the case where content items are stored in the storage unit 101 in the content selection apparatus, instead of storing content items in the content selection apparatus, the content selection apparatus may obtain content items stored in a recording medium or another apparatus including a storage unit, and perform the work content creation process described in the embodiment.

In this case, the content selection apparatus includes an obtainment unit (not shown) that obtains content items from outside, instead of or separately from the storage unit 101. The obtainment unit may not only obtain content items from outside but, in the case where content items are stored in the content selection apparatus, obtain content items from inside the content selection apparatus.

In each of the above embodiments, information relating to content items selected for work content creation previously may be stored in the storage unit 101 as selection history information. In this case, the selection unit 103 may refer to the selection history information and select, as content items for creating a new work content item, each content item whose frequency of being selected for work content creation is less than or equal to a predetermined value. The content item selected based on the selection history information is not limited to this. As another example, each content item whose frequency of being selected is a predetermined value (e.g. 0 or 1) may be selected.

In this way, the content selection apparatus can create a new work content item using content items each having a low frequency of being selected for work content creation previously. As a result, the user can view more types of content items as a work content item.

Though each of the above embodiments describes the case where content items are sorted into folders by the creation date and time, content items may be sorted into folders based on a parameter other than the creation date and time.

The content selection apparatus may perform content selection while switching between the content selection methods described in the above embodiments. In this case, the content selection apparatus further includes a selection mode switching unit that switches a selection mode which is a method of content selection by the selection unit 103.

The content selection apparatus described in each of the above embodiments may be realized by a computer.

The present invention may also be the method described above. The present invention may also be a computer program that realizes the method by a computer. The present invention may also be a digital signal corresponding to the computer program.

The present invention may also be a computer-readable recording medium, such as a flexible disk, a hard disk, a CD-ROM, an MO, a DVD, a DVD-ROM, a DVD-RAM, a BD (Blu-ray Disc®), a USB memory, a memory card including an SD memory card, or a semiconductor memory, on which the computer program or the digital signal is recorded. Conversely, the present invention may be the digital signal recorded on such a recording medium.

The present invention may also be the computer program or the digital signal transmitted via an electric communication line, a wired or wireless communication line, a network such as the Internet, data broadcasting, and the like.

The present invention may also be a computer system that includes a microprocessor and a memory. The computer program may be stored in the memory, with the microprocessor operating in accordance with the computer program.

The computer program or the digital signal may be provided to another independent computer system by distributing the recording medium on which the computer program or the digital signal is recorded, or by transmitting the computer program or the digital signal via the network and the like. The independent computer system may then execute the computer program or the digital signal to function as the present invention.

The above embodiments and variations may be freely combined.

The embodiments disclosed herein are to be considered as in all aspects illustrative and not restrictive. The scope of the present invention is defined by the claims rather than by the foregoing description, and all modifications within the scope of the claims and within the meaning and scope of equivalence of the claims are intended to be included in the scope of the present invention.

Though the content selection apparatus according to one or more aspects has been described by way of the embodiments above, the present invention is not limited to these embodiments. Modifications obtained by applying various changes conceivable by those skilled in the art to the embodiments and any combinations of structural elements in different embodiments are also included in the scope of one or more aspects without departing from the scope of the present invention.

The content selection apparatus according to the present invention is applicable, for example, to a personal computer or a hard disk recorder that creates a slideshow and the like from content items such as still images or moving images.

REFERENCE SIGNS LIST 100, 100a, 100b, 100c, 100d Content selection apparatus
101 Storage unit
102 Determination unit
103 Selection unit
104 Creation unit
105 Display unit
106 Loading unit
201, 202, 203 Folder
204 Folder metadata file
205, 206 Content item
301 Folder ID
302 Folder name
303 Number of content items
304 Earliest capture date and time
305 Latest capture date and time
601 Feature value extraction unit
602 Importance level calculation unit
701 Content ID
702 Filename
703 Capture date and time
704 Object ID
705 Object area
706 Object feature value
801, 2001 Content item
802, 2002 Frame
1001 Cluster ID
1002 Number of objects in cluster
1003 Importance level
1401 Elevation angle
1701 Text information extraction unit
2301 Communication unit
2302 Rule storage unit

The invention claimed is:

1. A content selection apparatus that selects a content item from a plurality of content items, the content selection apparatus comprising:
a non-transitory computer-readable recording medium storing a program; and
a hardware processor that executes the program and causes the content selection apparatus to operate as:
an obtainment unit that obtains the plurality of content items;
a selection unit that selects a target content item from the plurality of content items, the target content item being a content item to be presented to a user;
a selection mode switching unit that selects a selection mode which is a selection method for the target content item by the selection unit;
a feature value extraction unit that, for each of the plurality of content items, detects an object included in the content item and extracts a feature value of the detected object; and
an importance level calculation unit that classifies a plurality of objects detected by the feature value extraction unit into groups of objects similar to each other based on feature values, determines an importance level for each group of objects based on a predetermined condition, and assigns the importance level to the objects,
wherein each of the plurality of content items is sorted into one of a plurality of management units that corresponds to a creation date of the content item,
the selection unit selects a predetermined number of management units in ascending order of the number of sorted content items, and selects a content item that belongs to the selected management units as the target content item, and
the selection unit, in the case where a selection date on which the content selection apparatus selects the target content item is at least a predetermined number of days after a beginning day of a first period to which the selection date belongs, selects the target content item from the plurality of content items created in a second period that immediately precedes the first period,
the selection unit selects the predetermined number of management units in ascending order of the number of sorted content items and selects the content item that belongs to the selected management units as the target content item, in the case where the selection mode switching unit switches the selection mode to a first selection mode, and
the selection unit selects, as the target content item, a content item that includes an object whose importance level is less than or equal to a predetermined value from among the plurality of content items, in the case where the selection mode switching unit switches the selection mode to a third selection mode different from the first selection mode.

2. The content selection apparatus according to claim 1, wherein the selection unit selects a predetermined number of target content items.

3. The content selection apparatus according to claim 1, wherein the selection unit selects a predetermined number of management units in descending order of the number of sorted content items and selects a content item that belongs to the selected management units as the target content item, in the case where the selection mode switching unit switches the selection mode to a second selection mode different from the first selection mode.

4. The content selection apparatus according to claim 1, wherein each of the plurality of content items includes information indicating an elevation angle when capturing the content item, and
the selection unit selects the target content item from the plurality of content items whose elevation angles are within a predetermined range.

5. The content selection apparatus according to claim 1, further comprising
a communication unit that receives a creation rule from a server provided outside the content selection apparatus, the creation rule being information that indicates a creation method for a work content item made up of a plurality of target content items and includes a selection method for the target content item,
wherein the selection unit selects the target content item according to the selection method indicated in the creation rule received by the communication unit.

6. The content selection apparatus according to claim 5, further comprising
a rule storage unit that stores creation rule information that associates the creation rule with execution information indicating whether or not the work content item is created using the creation rule,
wherein the selection unit selects the target content item according to a selection method indicated in, from among the creation rule included in the creation rule information, a creation rule associated with execution information indicating that the work content item is not created using the creation rule.

7. The content selection apparatus according to claim 5, wherein the content selection apparatus creates any of an album, a slideshow, and a short movie using the plurality of target content items, as the work content item.

8. The content selection apparatus according to claim 5, further comprising
a storage unit that stores selection history information relating to each content item selected when creating the work content item,
wherein the selection unit selects the target content item from the plurality of content items whose frequencies of being selected when creating the work content item are less than or equal to a predetermined value, based on the selection history information.

9. The content selection apparatus according to claim 1, wherein the plurality of content items are still images or moving images.

10. The content selection apparatus according to claim 1, wherein each of the plurality of content items includes information relating to a creation date of the content item, and
the selection unit selects the target content item from the plurality of content items whose creation dates are within a predetermined period.

11. The content selection apparatus according to claim 1, wherein each of the plurality of content items includes information relating to a creation location of the content item, and
the selection unit selects the target content item from the plurality of content items whose creation locations are within a predetermined range.

12. A content selection apparatus that selects a content item from a plurality of content items, the content selection apparatus comprising:
a non-transitory computer-readable recording medium storing a program; and
a hardware processor that executes the program and causes the content selection apparatus to operate as:
an obtainment unit that obtains the plurality of content items;
a selection unit that selects a target content item from the plurality of content items, the target content item being a content item to be presented to a user;
a selection mode switching unit that selects a selection mode which is a selection method for the target content item by the selection unit; and
a feature value extraction unit that, for each of the plurality of content items, detects whether or not a predetermined object is included in the content item,
wherein each of the plurality of content items is sorted into one of a plurality of management units that corresponds to a creation date of the content item,
the selection unit selects a predetermined number of management units in ascending order of the number of sorted content items, and selects a content item that belongs to the selected management units as the target content item, and
the selection unit, in the case where a selection date on which the content selection apparatus selects the target content item is at least a predetermined number of days after a beginning day of a first period to which the selection date belongs, selects the target content item from the plurality of content items created in a second period that immediately precedes the first period,
wherein the selection unit selects the predetermined number of management units in ascending order of the number of sorted content items and selects the content item that belongs to the selected management units as the target content item, in the case where the selection mode switching unit switches the selection mode to a first selection mode,
each of the plurality of content items includes information indicating an elevation angle when capturing the content item, and
the selection unit selects, as the target content item, a content item that includes the predetermined object and whose elevation angle is within a predetermined range from among the plurality of content items, in the case where the selection mode switching unit switches the selection mode to a fourth selection mode different from the first selection mode.

13. A content selection apparatus that selects a content item from a plurality of content items, the content selection apparatus comprising:
a non-transitory computer-readable recording medium storing a program; and
a hardware processor that executes the program and causes the content selection apparatus to operate as:
an obtainment unit that obtains the plurality of content items;
a selection unit that selects a target content item from the plurality of content items, the target content item being a content item to be presented to a user;
a selection mode switching unit that selects a selection mode which is a selection method for the target content item by the selection unit; and
a text information extraction unit that extracts text information from a content item that includes text from among the plurality of content items, the text information relating to the text,
wherein each of the plurality of content items is sorted into one of a plurality of management units that corresponds to a creation date of the content item,
the selection unit selects a predetermined number of management units in ascending order of the number of sorted content items, and selects a content item that belongs to the selected management units as the target content item,
the selection unit, in the case where a selection date on which the content selection apparatus selects the target content item is at least a predetermined number of days after a beginning day of a first period to which the selection date belongs, selects the target content item from the plurality of content items created in a second period that immediately precedes the first period,
the selection unit selects the predetermined number of management units in ascending order of the number of sorted content items and selects the content item that belongs to the selected management units as the target content item, in the case where the selection mode switching unit switches the selection mode to a first selection mode, and
the selection unit selects, as the target content item, the content item from which the text information is extracted from among the plurality of content items, in the case where the selection mode switching unit switches the selection mode to a fifth selection mode different from the first selection mode.

14. The content selection apparatus according to claim 13, wherein the selection unit selects, as the target content item, the content item from which the text information indicating the text whose text area has a size smaller than a predetermined value is extracted.

15. The content selection apparatus according to claim 13, wherein the selection unit selects, as the target content item, the content item from which the text information indicating the text whose text area has a size larger than a predetermined value is extracted.

16. A content selection method for a content selection apparatus of selecting a content item from a plurality of content items, the content selection apparatus including a non-transitory computer-readable recording medium storing a program, and a hardware processor that executes the program and causes the content selection apparatus to perform the content selection method, the content selection method comprising:

obtaining the plurality of content items;
  selecting a target content item from the plurality of content items, the target content item being a content item to be presented to a user;
  selecting a selection mode which is a selection method for the target content item by the selection unit;
  detecting, for each of the plurality of content items, an object included in the content item and extracting a feature value of the detected object; and
  classifying a plurality of objects detected by the feature value extracting step into groups of objects similar to each other based on feature values, determining an importance level for each group of objects based on a predetermined condition, and assigning the importance level to the objects,
  wherein each of the plurality of content items is sorted into one of a plurality of management units that corresponds to a creation date of the content item,
  a predetermined number of management units is selected in ascending order of the number of sorted content items, and a content item that belongs to the selected management units is selected as the target content item,
  in the case where a selection date on which the content selection apparatus selects the target content item is at least a predetermined number of days after a beginning day of a first period to which the selection date belongs, the target content item is selected from the plurality of content items created in a second period that immediately precedes the first period,
  the predetermined number of management units is selected in ascending order of the number of sorted content items and the content item that belongs to the selected management units is selected as the target content item, in the case where the selection mode switching step switches the selection mode to a first selection mode, and
  a content item is selected, as the target content, that includes an object whose importance level is less than or equal to a predetermined value from among the plurality of content items, in the case where the selection mode switching step switches the selection mode to a third selection mode different from the first selection mode.

17. A non-transitory recording medium for use in a computer, the recording medium having a program of the content selection method according to claim 16 recorded thereon.

* * * * *